United States Patent Office 3,453,267
Patented July 1, 1969

3,453,267
NOVEL PROCESS FOR THE PREPARATION OF 3-OXO-Δ$^{4,9,11}$-TRIENIC STEROIDS
Michel Vignau, Neuilly-sur-Seine, Robert Bucourt, Clichy-sous-Bois, Jean Tessier, Vincennes, Germain Costerousse, Montrouge, Lucien Nedelec, Clichy-sous-Bois, Jean-Claude Gasc, Bondy, Robert Joly, Montmorency, Julien Warnant, Neuilly-sur-Seine, and Bernard Goffinet, Paris, France, assignors to Roussel-Uclaf, Paris, France, a corporation of France
No Drawing. Filed Dec. 28, 1965, Ser. No. 517,061
Claims priority, application France, Dec. 31, 1964, 614; Feb. 25, 1965, 7,226; Mar. 24, 1965, 10,513; June 14, 1965, 20,723; Sept. 3, 1965, 30,381; Sept. 17, 1965, 31,794
Int. Cl. C07c 167/14, 169/10, 173/00
U.S. Cl. 260—239.55                19 Claims

ABSTRACT OF THE DISCLOSURE

The invention relates to a novel process for the production of 3-oxo-19-nor-Δ$^{4,9,11}$-trienic steroids which comprises the steps of reacting the corresponding 3-oxo-19-nor-Δ$^{5(10),9(11)}$-dienic steroids in an organic solvent with a dehydrogenating substituted p-quinone and recovering said 3-oxo-19-nor-Δ$^{4,9,11}$-trienic steroids. The invention also relates as well to the production of novel intermediates and final products.

---

Recent research works have shown interest in certain trienic analogs of the testosterone. In particular, derivatives of 19-nor-testosterone having two supplementary double bonds in the 9 and 11 positions and being diversely substituted in the 17 position have proven of interest (see, for example, Belgian Patent No. 631,298 and the publications by Velluz et al., Comptes Rendus Acad. Sc. 257, p. 569 [1963], and Feyel-Cabanes, Comptes Rendus Soc. Biol. 157, p. 1428 [1963]).

However, the access to the trienic structures, mentioned previously, requires a long series of reactions, such as the introduction of a bromine atom in the 11 position and dehydrobromination, as described in the above-mentioned Belgian patent.

It has now been found possible to obtain the desired trienic structures by reacting a 3-oxo-19-nor-Δ$^{5(10),9(11)}$-bis-dehydro steroid with a substituted p-quinone.

An object of the present invention is the development of a process for the production of a 3-oxo-19-nor-Δ$^{4,9,11}$-trienic steroid which comprises the steps of reacting a corresponding 3-oxo-19-nor-Δ$^{5(10),9(11)}$-dienic steroid in an organic solvent with a dehydrogenating substituted p-quinone, and recovering said 3-oxo-19-nor-Δ$^{4,9,11}$-trienic steroid.

A further object of the present invention is the obtention of novel intermediates and 3-oxo-19-nor-Δ$^{4,9,11}$-trienic steroids having hormonal properties.

A still further object of the present invention is the development of a process for the production of a 3-oxo-19-nor-Δ$^{4,9,11}$-trienic steroid of the formula

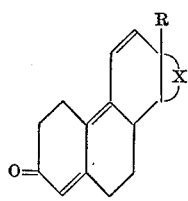

wherein R represents lower alkyl and X represents a member selected from the group consisting of a substituted or a nonsubstituted remainder of the pentagonal D cycle and a substituted or a nonsubstituted remainder of the hexagonal D-homo cycle, which comprises the steps of reacting the corresponding 3-oxo-19-nor-Δ$^{5(10),9(11)}$-dienic steroids of the formula

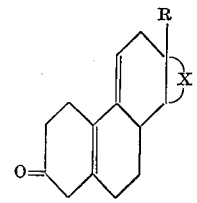

wherein R and X have the above-assigned values, in an organic solvent with a dehydrogenating substituted p-benzo quinone, and recovering said 3-oxo-19-nor-Δ$^{4,9,11}$-trienic steroid.

These and other objects of the present invention will become more apparent as the description thereof proceeds.

We have now discovered a novel process for the preparation of 3-oxo-19-nor-Δ$^{4,9,11}$-trienic steroids characterized in that the corresponding 3-oxo-19-nor-Δ$^{5(10),9(11)}$-bis-dehydro steroids are subjected in an organic solvent to the action of a dehydrogenating substituted p-quinone.

This novel process can be applied to a field of wide scope.

The term steroid as employed in the preceding comprises indiscriminately all compounds possessing the form of natural hormones, all compounds having the antipode structure, as well as their racemic forms.

More particularly, the present invention applies to the preparation of 3-oxo-19-nor-Δ$^{4,9,11}$-trienic steroids of the general formula

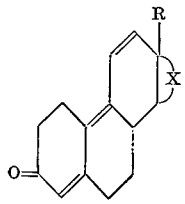

wherein R represents a lower alkyl radical and X represents the remainder of a pentagonal or hexagonal cycle, substituted or non-substituted.

The A and B rings of the steroid molecule may, in addition, be substituted in the 1, 2, 4, 6 and/or 7 positions by a halogen or by an alkyl.

The process may be executed to advantage with the aid of dehydrogenating substituted quinones, in particular, those having the formula

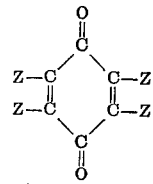

wherein Z represents a member selected from the group consisting of hydrogen, halogen and cyano with the proviso that Z represents no more than two hydrogen, the halogen being preferentially chlorine or bromine, such as 2,3-dichloro-5,6-dicyano-p-benzoquinone; 2,3-dibromo-5,6-dicyano-p-benzoquinone; 2,3,5,6-tetrachloro-p-benzoquinone; 2,3-dicyano-5-chloro-p-benzoquinone or 2,3-dicyano-p-benzoquinone.

Actually, it is preferable to employ 2,3-dichloro-dicyano-p-benzoquinone and 2,3-dibromo-5,6-dicyano-p-benzoquinone.

The reaction can be effected in numerous organic solvents, it being understood that the steroid and the p-benzoquinone are both soluble and stable therein. Methylene chloride, dichloroethane, benzene, toluene, dioxane, ethyl acetate or propyl acetate are used advantageously. Still other solvents may be employed, for example, chlorobenzene, the diethyl ether of diethylene glycol; dimethylformamide, nitrobenzene, dimethylsulfoxide or ether.

In general, the reaction is conducted at a temperature of approximately room temperature or at a moderately elevated temperature. Preferably, the work is carried out under an atmosphere of an inert gas, for example, nitrogen.

It is also possible, instead of starting with a 3-oxo-$\Delta^{5(10),9(11)}$-bis-dehydro steroid, to use as a starting compound, a 3-hydroxy-$\Delta^{5(10),9(11)}$-bis-dehydro steroid, which, under the action of the quinonic reactant, is oxidized in the 3 position into the corresponding ketone and converted into the corresponding $\Delta^{4,9,11}$ triene.

As previously indicated, the starting materials can be from an extremely broad class of steroids as long as they contain two double bonds in the 5(10) and 9(11) positions and an oxo or hydroxyl group in the three position. Substituents may be present in the A or B rings on the positions enumerated above when either halogens or lower alkyls are involved. The examples which follow show the reaction utilizing many different steroid starting compounds.

The following examples will serve for better comprehension of the invention without, however, limiting the scope of the invention in any manner.

EXAMPLE 1

PREPARATION OF $\Delta^{4,9,11}$-ESTRATRIENE-3,17-DIONE (a) 100 mg. of 3,17-dioxo-$\Delta^{5(10),9(11)}$-estradiene (described in copending commonly assigned U.S. patent application Ser. No. 373,048, filed June 5, 1964, now Pat. No. 3,282,785) were dissolved in 10 cc. of anhydrous benzene and 170 mg. of 2,3-dichloro-5,6-dicyano-p-benzoquinone in a solution of 4 cc. of benzene were added thereto. The reaction mixture was allowed to stand overnight at room temperature under an atmosphere of nitrogen. Next, the mixture was filtered and the filtrate was evaporated to dryness under vacuum. The residue obtained was dissolved in methylene chloride and subjected to chromatography through magnesium silicate.

Elution with methylene chloride (containing 2% acetone) supplied in practically quantitative manner $\Delta^{4,9,11}$-estratriene-3,17-dione, which was recrystallized from a methylene chloride-isopropyl ether mixture (1:4) at an elevated temperature.

The product obtained had a melting point of 139° C. The ultraviolet spectra confimed its structure:

$\lambda_{max}$. 338 m$\mu$; $\epsilon=26,600$ $\lambda_{max}$. 235 m$\mu$; $\epsilon=5,700$ When mixed with a sample of $\Delta^{4,9,11}$-estratriene-3,17-dione prepared by a different method (described in copending commonly assigned U.S. patent application Ser. No. 458,416, filed May 24, 1965), the product did not cause a drop in the melting point.

(b) 135 mg. $\Delta^{5(10),9(11)}$-estradiene-3,17-dione were dissolved in 15 cc. of anhydrous benzene, then 160 mg. of 2,3 - dibromo - 5,6-dicyano-p-benzoquinone dissolved in 5 cc. of benzene were added, and the reaction mixture was allowed to stand up under an atmosphere of nitrogen for 7 hours at room temperature.

By operating as described above, $\Delta^{4,9,11}$-estratriene-3,17-dione was obtained, identical to the product described under (a) with a yield of 65%. $\Delta^{4,9(10),11}$-estratriene-3,17-dione is a product endowed with an anabolisant and an androgenic action.

EXAMPLE 2

PREPARATION OF $\Delta^{4,9,11}$-ESTRATRIENE-3,17-DIONE 100 mg. of 2,3-dichloro-5,6-dicyano-p-benzoquinone were dissolved in 3.5 cc. of ether, saturated with water, then 70 mg. of 3,3-dimethoxy-$\Delta^{5(10),9(11)}$-estradiene-17-one were added to the solution obtained and the mixture was agitated for a period of 5½ hours at room temperature.

Thereafter, neutral sodium sulfate and 5 cc. of benzene were added to the reaction mixture, which was next reduced to a small volume under an atmosphere of nitrogen, filtered and washed with benzene. The filtrate obtained was evaporated to dryness. The residue was subjected to chromatography through magnesium silicate and eluted with methylene chloride containing 1% of acetone. After recrystallization from isopropyl ether, 18.1 mg of $\Delta^{4,9,11}$-estratriene-3,17-dione were obtained having a melting point of 139° C.

This product was insoluble in water, slightly soluble in isopropyl ether and soluble in ether and benzene.

Ultraviolet spectra (ethanol):

$\lambda_{max}$. 335 m$\mu$; $\epsilon=23,800$

The initial starting compound, 3,3-dimethoxy-$\Delta^{5(10),9(11)}$-estradiene-17-one was obtained as follows:

52 g. of $\Delta^{5(10),9(11)}$-estradiene-3,17-dione were introduced into 260 cc. of methanol. A stream of nitrogen was allowed to bubble through the reaction mixture for ¼ hour. Then 13 cc. of a solution prepared by adding 0.5 cc. of acetyl chloride to 100 cc. of methanol were added thereto. The reaction mixture was agitated for 1 hour at room temperature.

Next, the reaction mixture was cooled for 1 hour at a temperature of −10° C. and vacuum filtered thereafter. The residue was triturated in iced methanol. 52.6 g. of 3,3-dimethoxy-$\Delta^{5(10),9(11)}$-estradiene-17-one were thus obtained having a melting point of 112° C. and a specific rotation $[\alpha]_D^{20} = +319° \pm 2.5°$ (c.=1% in dioxane containing 1% of pyridine).

The use of 2,3-dibromo-5,6-dicyano-p-benzoquinone in place of the corresponding dichloro derivative leads to an identical result.

EXAMPLE 3

PREPARATION OF $\Delta^{4,9,11}$-ESTRATRIENE-3,17-DIENE 10 mg. of 3-pyrrolidyl-$\Delta^{3,5(10),9(11)}$-estratriene-17-one (described in copending commonly-assigned U.S. patent application Ser. No. 373,048, filed June 5, 1964, now Pat. No. 3,282,785) were introduced into 25 mg. of 60% aqueous pyruvic acid solution and the reaction mixture was agitated while heating it to a temperature of 100° C. for 2 minutes. The solution obtained was cooled and diluted with an addition of 1.8 cc. of methylene chloride. Next, 33.6 mg. of pulverulent 2,3-dichloro-5,6-dicyano-p-benzoquinone were rapidly added thereto, and the reaction mixture was agitated for a period of 2 hours and 45 minutes at room temperature.

Thereafter, and according to the usual methods outlined above, $\Delta^{4,9,11}$-estratriene-3,17-dione was isolated. The use of 2,3-dibromo-5,6-dicyano-p-benzoquinone in place of the corresponding dichloro derivative leads to the same result.

EXAMPLE 4

PREPARATION OF 17$\beta$-BENZOYLOXY-$\Delta^{4,9,11}$-ESTRATRIENE-3-ONE 19 mg. of 17$\beta$-benzoyloxy-$\Delta^{5(10),9(11)}$-estradiene-3-one, described in U.S. Patent No. 3,052,672, and 22.7 mg. of 2,3-dichloro-5,6-dicyano-p-benzoquinone were dissolved in 1.75 cc. of anhydrous benzene, and the reaction mixture was agitated at room temperature for a period of 24 hours. Thereafter, the reaction mixture was extracted with benzene and the extracts were washed with diluted sodium bisulfite solution and with water.

The organic layer was recovered and evaporated to dryness. The residue obtained was redissolved in benzene and the insoluble substance was filtered. After evaporation of the filtrate to dryness, the residue was taken up with isopropyl ether and then evaporated to dryness under an atmosphere of nitrogen to recover 26 mg. of product.

This product was subjected to chromatography through magnesium silicate, eluted with methylene chloride containing 0.5% of acetone and crystallized from isopropyl ether. Next, the product was vacuum filtered and dried under an atmosphere of nitrogen. After recrystallization from isopropyl ether heated to reflux, 11.88 mg. of 17β-benzoyloxy-$\Delta^{4,9,11}$-estratriene-3-one were obtained, having a melting point of 151–152° C. This melting point was not lowered in a mixture with a sample obtained by other methods.

The product occurred in the form of pale yellow crystals, insoluble in water, soluble in methanol, benzene and methylene chloride.

The use of 2,3-dibromo-5,6-dicyano-p-benzoquinone in place of the corresponding dichloro derivative leads to the same result.

The 17β-benzoyloxy-$\Delta^{4,9,11}$-estratriene - 3 - one is a product endowed with a moderate androgenic action and with a marked anabolisant action.

EXAMPLE 5

PREPARATION OF 17β-BENZOYLOXY-$\Delta^{4,9,11}$-ESTRATRIENE-3-ONE 10 mg. of 3-pyrrolidyl-17β-benzoyloxy-$\Delta^{3,5(10),9(11)}$-estratriene, described in U.S. Patent No. 3,052,672, were introduced into 32 mg. of 60% aqueous pyruvic acid solution and the reaction mixture was agitated for several minutes at a temperature of 100° C. The solution obtained was cooled and diluted by the addition of 1.8 cc. of methylene chloride. Next, 22.3 mg. of 2,3-dichloro-5,6-dicyano-p-benzoquinone were rapidly added thereto, and the reaction mixture was agitated for 1 hour and 45 minutes at room temperature.

Thereafter, according to the usual methods outlined above, the 17β-benzoyloxy-$\Delta^{4,9,11}$-estratriene-3-one was isolated.

The use of 2,3-dibromo-5,6-dicyano-p-benzoquinone in place of the corresponding dichloro derivative leads to the same result.

EXAMPLE 6

PREPARATION OF $\Delta^{4,9,11}$-ESTRATRIENE-17β-OL-3-ONE

At room temperature, 200 mg. of $\Delta^{5(10),9(11)}$-estradiene-17β-ol-3-one, described in U.S. Patent No. 3,052,672, were dissolved in 16 cc. of anhydrous benzene. Then, dropwise, 352 mg. of 2,3-dichloro-5,6-dicyano-p-benzoquinone dissolved in 8 cc. of benzene were added thereto. The reaction mixture was agitated for a period of 15 hours at room temperature. Thereafter the reaction mixture was filtered and washed with benzene. The combined filtrate and wash liquors were evaporated to dryness under vacuum. The residue was taken up with methylene chloride, then subjected to chromatography through magnesium silicate and eluted with fractions of methylene chloride containing 1%, 2% and 5% of acetone.

The different fractions were combined and evaporated to dryness under vacuum to obtain 170 mg., that is a yield of 85.5%, of $\Delta^{4,9,11}$-estratriene-17β-ol-3-one which has a melting point of 188° C. and a specific rotation $[\alpha]_D^{20} = +17.7°$ (c.=0.47% in ethanol) after recrystallization from isopropyl ether and from methanol heated to reflux.

Ultraviolet spectra (ethanol):

$\lambda_{max.}$ 340 m$\mu$; $\epsilon$=30,170

The product occurred in the form of yellowish white crystals, insoluble in water, slightly soluble in hot isopropyl ether, and soluble in ethanol and hot methanol.

The use of 2,3-dibromo-5,6-dicyano-p-benzoquinone in place of the corresponding dichloro derivative leads to the same result.

EXAMPLE 7

PREPARATION OF 17α-METHYL-$\Delta^{4,9,11}$-ESTRATRIENE-17β-OL-3-ONE

Under agitation, 64 mg. of 3,3-dimethoxy-17α-methyl-$\Delta^{5(10),9(11)}$-estradiene-17β-ol were introduced into 0.5 cc. of acetic acid and 0.25 cc. of water. The reaction mixture was allowed to stand for 1 hour at room temperature. Next, 5 cc. of water were slowly added thereto. The reaction mixture was taken up in 15 cc. of benzene, adjusted to a pH value of 8.5 by the addition of sodium bicarbonate and then washed with water.

The organic phase was then dried and evaporated to dryness under vacuum to obtain, after purification, 36.8 mg. of 17α-methyl-$\Delta^{5(10),9(11)}$-estradiene-17β-ol-3-one.

The product thus obtained was introduced into 3.7 cc. of anhydrous benzene and a solution of 71 mg. of 2,3-dichloro-5,6-dicyano-p-benzoquinone in 1.85 cc. of anhydrous benzene was added and the reaction mixture was agitated for 2 hours at room temperature. Next, the reaction mixture was filtered. 20 cc. of benzene and 10 cc. of ether were added to the filtrate obtained which was then washed first with a N/10 sodium hyposulfite solution and then with water, dried and evaporated to dryness under vacuum. The residue was subjected to chromatography through magnesium silicate and eluted with fractions of methylene chloride containing 0.5%, 1% and 2% of acetone.

The combined fractions were evaporated under an atmosphere of nitrogen. After recrystallization from isopropyl ether, 12.6 mg. of 17α-methyl-$\Delta^{4,9,11}$-estratriene-17β-ol-3-one were obtained, having a melting point of 170° C. No depression in melting point in the mixture with a sample obtained by other means was noted.

Ultraviolet spectra (ethanol):

$\lambda_{max.}$ 339 M$\mu$; $\epsilon$=29,620

This compound was insoluble in water, slightly soluble in isopropyl ether, and soluble in acetone, benzene and methylene chloride.

The use of 2,3-dibromo-5,6-dicyano-p-benzoquinone instead of the corresponding dichloro derivative leads to the same result.

17α-methyl-$\Delta^{4,9,11}$-estratriene-17β-ol-3-one is a very active androgen and anabolisant. It is also endowed with an inhibitory action on hyphosysis.

3,3 - dimethoxy-17α-methyl-$\Delta^{5(10),9(11)}$-estradiene-17β-ol, utilized as the starting compound, may be prepared according to the following method:

632 mg. of 3,3 - dimethoxy-$\Delta^{5(10),9(11)}$-estradiene-3-one, obtained according to the process described in Example 2, were introduced into 10 cc. of anhydrous benzene. Then, 5 cc. of a 3 N methyl magnesium bromide solution in ether were added to the reaction mixture which was then heated at reflux under an atmosphere of nitrogen for a period of 3 hours. Next, the reaction mixture was cooled and poured into 50 cc. of a saturated aqueous solution of ammonium chloride containing 5% of ammonia. The mixture was then extracted with a mixture of ether and benzene. The organic phase was washed with water, dried and evaporated to dryness under vacuum to obtain 665 mg. of 3,3 - dimethoxy-17α-methyl-$\Delta^{5(10),9(11)}$-estradiene-17β-ol.

EAMPLE 8

PREPARATION OF 17α-ETHYNYL-Δ$^{4,9,11}$-ESTRATRIENE-17β-OL-3-ONE 29.6 mg. of 17α-ethynyl-Δ$^{5(10),9(11)}$-estradiene-17β-ol-3-one, described in U.S. Patent No. 3,033,856, and 45.7 mg. of 2,3-dichloro-5,6-dicyano-p-benzoquinone were introduced into 3.5 cc. of anhydrous benzene and the reaction mixture was agitated at room temperature for 26 hours. The mixture was then vacuum filtered and washed with benzene. 10 cc. of benzene and 3 cc. of sodium bisulfite diluted to a fifth were added to the filtrate. The organic phase was separated, washed with water, filtered and evaporated to dryness.

The residue thus obtained was dissolved in methylene chloride and the solvent was evaporated under an atmosphere of nitrogen. The product obtained in this manner was then crystallized from isopropyl ether. 28.9 mg. of 17α - ethylnyl - Δ$^{4,9,11}$-estratriene-17β-ol-3-one were recovered which, after recrystallization, had a melting point of 170 C.

Ultraviolet spectra (ethanol):

$\lambda_{max.}$ 340 M$\mu$; $\epsilon$=29,600

The product occurred in the form of crystals, insoluble in water, slightly soluble in hot isopropyl ether, and soluble in methanol, ethanol, benzene and methylene chloride.

The utilization of 2,3 - dibromo-5,6-dicyano-p-benzoquinone instead of the corresponding dichloro derivative leads to the same result.

The 17α - ethynyl-Δ$^{4,9,11}$-estratriene - 17β-ol-3-one is endowed with a progestomimetic and a hypophysial inhibitory action.

EXAMPLE 9

PREPARATION OF 19-NOR-Δ$^{4,9,11}$-PREGNATRIENE-3,20-DIONE 50 mg. of 19-nor-Δ$^{5(10),9(11)}$-pregnadiene-3,20-dione, obtained according to the process described in U.S. patent application Ser. No. 458,416, filed May 24, 1965, were dissolved in 44 cc. of anhydrous benzene. Next, a solution of 80 mg. of 2,3-dichloro-5,6-dicyano-p-benzoquinone in 2 cc. of anhydrous benzene was added dropwise to the reaction mixture, which was then agitated at room temperature for 4 hours. Thereafter, the mixture was filtered and rinsed with benzene. The filtrate was washed first with N/10 sodium hyposulfite solution containing ether and then with water, dried and evaporated to dryness.

The residue was crystallized from isopropyl ether and vacuum filtered. 48.4 mg., a yield of 97.5%, of 19-nor-Δ$^{4,9,11}$ - pregnatriene-3,20-dione were obtained, having a melting point of 100–101° C. and a specific rotation [α]$_D^{20}$=+102° (c.=0.5% in methanol).

Ultraviolet spectra (ethanol):

$\lambda_{max.}$ 338 m$\mu$; $\epsilon$=29,250

This product occurred in the form of crystals, insoluble in water, and soluble in benzene, methanol, ether and hot isopropyl ether.

The utilization of 2,3 - dibromo-5,6-dicyano-p-benzoquinone in place of the corresponding dichloro derivative furnished the same result.

19-nor-Δ$^{4,9,11}$-pregnatriene-3,20-dione is endowed with a progestative action when administered orally or transcutaneously.

EXAMPLE 10

PREPARATION OF 17α-PROPYNYL-Δ$^{4,9,11}$-ESTRATRIENE-17β-OL-ONE

Under agitation, 100 mg. of 17α-propynyl-Δ$^{5(10),9(11)}$-estradiene-17β-ol-3-one were dissolved in 8 cc. of anhydrous benzene. A solution of 154 mg. of 2,3-dichloro-5,6-dicyano-p-benzoquinone in 4 cc. of anhydrous benzene was added thereto, and the reaction mixture was allowed to stand for 40 hours at room temperature. Thereafter, the reaction mixture was vacuum filtered and rinsed with benzene. The filtrate was diluted with 20 cc. of benzene and 10 cc. of ether, washed first with 0.1 N sodium hyposulfite solution and then with water, dried and evaporated to dryness.

The residue was recrystallized from isopropyl ether, thus obtaining 56.3 mg. of 17α-propynyl-Δ$^{4,9,11}$-estratriene-17β-ol-3-one. The product had a melting point of 166° C. and a specific rotation [α]$_D^{20}$=+115° (c.=0.4% in methanol).

Ultraviolet spectra (ethanol):

$\lambda_{max.}$ 341 m$\mu$; $\epsilon$=29,840

This product occurred in the form of crystals, insoluble in water, slightly soluble in isopropyl ether and soluble in benzene, methylene chloride and hot methanol.

Using 2,3-dibromo-5,6-dicyano-p-benzoquinone in the place of the corresponding dichloroderivative leads to the same result.

17α-propynyl-Δ$^{4,9,11}$-estratriene - 17β - ol-3-one is endowed with an antizygotic and progestomimetic action.

The 17α-propynyl-Δ$^{5(10),9(11)}$-estradiene - 17β - ol-3-one utilized as the starting compound was prepared in the following manner.

(a) 100 cc. of an ethereal solution of 3.4 N methyl magnesium bromide were cooled to about 0° C. Then, under agitation and under an atmosphere of nitrogen, 500 cc. of a solution containing 13% of gaseous propyne in tetrahydrofuran were added thereto. This latter solution was prepared at the time of utilization by allowing a stream of propyne to bubble through the iced tetrahydrofuran. A stream of propyne was bubbled through the mixture for a period of 3¼ hours.

To the magnesium containing solution, prepared as described in the preceding, a solution of 10 g. of 3,3-dimethoxy-Δ$^{5(10),9(11)}$-estradiene-17-one (described in Example 2) in 100 cc. of anhydrous benzene was added. The reaction mixture was heated at reflux for 3 hours while bubbling propyne continuously therethrough. Next, the reaction mixture was cooled and the addition of propyne was stopped. A saturated solution of ammonium chloride containing 10% of ammonia was added thereto and the reaction mixture was then extracted with ether. The organic phase was washed with water, dried, concentrated to a small volume and subjected to chromatography through magnesium silicate with elution with benzene containing 0.25% of methanol. 3,3-dimethoxy-17α-propynyl-Δ$^{5(10),9(11)}$-estradiene-17β-ol was obtained.

This compound is not described in the literature.

(b) 10 g. of 3,3-dimethoxy-17α-propynyl-Δ$^{5(10),9(11)}$-estradiene-17β-ol were introduced into 87 cc. of acetic acid containing 5% of water and the reaction mixture was agitated for 15 minutes at a temperature of about 30° C. 16.5 cc. of water were added thereto and the reaction mixture was agitated for a further hour, then vacuum filtered, washed with water and dried to obtain 7.9 g. of 17α-propynyl-Δ$^{5(10),9(11)}$-estradiene - 17β - ol-3-one with a melting point of 140° C.

Ultraviolet spectra (ethanol):

$\lambda_{max.}$ 240–241 m$\mu$; $\epsilon$=20,000

Infrared spectra in chloroform:
Showed the absence of the ether functions in the 3-position replaced by a non-conjugated ketone function with a double bond; moreover, the presence of an alcohol function at 3600 cm.$^{-1}$ was observed.

The product was insoluble in water and in dilute aqueous acids, and soluble in most of the usual organic solvents.

This compound is not described in the literature.

EXAMPLE 11

PREPARATION OF 13β-ETHYL-Δ$^{4,9,11}$-GONA-TRIENE-3,17-DIONE

By following the same process as described in Example 1, but using as starting compound 13β-ethyl-Δ$^{5(10),9(11)}$-gonadiene - 3,17 - dione, 13β-ethyl-Δ$^{4,9,11}$-gonatriene-3,17-dione was obtained. This compound had a melting point of 145° C. and a specific rotation $[\alpha]_D^{20}=+202°$ (c.=0.54% in chloroform).

Analysis.—C$_{19}$H$_{22}$O$_2$; molecular weight=282.37. Calculated: C, 80.81%; H, 7.85%. Found: C, 81.0%; H, 8.1%.

Ultraviolet spectra (ethanol):
$\lambda_{max}$. 235–236 m$\mu$; $\epsilon$=5,500
$\lambda_{max}$. 339 m$\mu$; $\epsilon$=29,550

On the physiological level, the product presented a distinct androgenic and anabolisant activity when administered orally as well as subcutaneously.

The utilization of 2,3-dibromo-5,6-dicyano-p-benzoquinone in place of the corresponding dichloro derivative led to the same result.

13β-ethyl-Δ$^{5(10),9(11)}$-gonadiene - 3,17 - dione, used as starting compound in Example 11, may be prepared in the following manner:

(a) Conversion of 13β-ethyl-Δ$^{4,9}$-gonadiene-17β-ol-3-one into 3,3-dimethoxy - 13β - ethyl-Δ$^{5(10),9(11)}$-gonadiene-17β-ol 1.15 g. of 13β-ethyl-Δ$^{4,9}$-gonadiene-17β-ol-3-one, having a melting point of 157° C. and a specific rotation $[\alpha]_D^{20}=-338°$ (c.=1% in methanol), obtained according to the process described in the copending, commonly assigned U.S. patent application Ser. No. 361,872, filed Apr. 22, 1964, was placed in suspension in 11.5 cc. of 2, 2-dimethoxypropane. Under agitation, 1.15 cc. of a freshly prepared solution of 1% acetyl chloride in methanol was added to the suspension. After standing overnight at room temperature, the solution thus formed was poured into 100 cc. of an aqueous solution of sodium bicarbonate. Next, the solution was extracted with methylene chloride and the extracts were evaporated to dryness. 1.39 g. of residue of amorphous 3,3-dimethoxy-13β-ethyl-Δ$^{5(10),9(11)}$-gonadiene-17β-ol were obtained. This product was utilized as such for the next step in the preparation.

This compound is not described in the literature.

(b) Conversion of 3,3-dimethoxy-13β-ethyl-Δ$^{5(10),9(11)}$-gonadiene - 17β - ol into 3,3 - dimethoxy - 13β - ethyl-Δ$^{5(10),9(11)}$-gonadiene-17-one 3.7 g. of 3,3-dimethoxy-13β-ethyl-Δ$^{5(10),9(11)}$-gonadiene-17β-ol were dissolved in 465 cc. of toluene and 58.5 cc. of cyclohexanone. About 235 cc. of the reaction mixture were distilled therefrom over a period of 2 hours, while at the same time a solution of 2.94 g. of aluminum isopropylate in 330 cc. of toluene was added thereto. After this addition has been completed, the distillation was continued and within 1 hour 165 cc. of distillate were recovered.

The mixture was cooled, then admixed with a solution composed of 10.7 g. of potassium carbonate, 21.4 g. of the double salt of sodium and potassium tartrate, and 214 cc. of water. The solvents in the mixture were removed by steam distillation and the residual aqueous phase was extracted with ether. The extracts, evaporated to dryness, supplied 3.67 g. of residue, composed of amorphous 3,3 - dimethoxy-13β-ethyl-Δ$^{5(10),9(11)}$-gonadiene-17-one which was utilized as such for the next step in the preparation.

This compound is not described in the literature.

(c) Conversion of 3,3-dimethoxy-13β-ethyl-Δ$^{5(10),9(11)}$-gonadiene-17-one into 13β-ethyl-Δ$^{5(10),9(11)}$-gonadiene-3,17-dione 3.09 g. of 3,3-dimethoxy-13β-ethyl-Δ$^{5(10),9(11)}$-gonadiene-17-one were dissolved in 124 cc. of acetic acid. Next, 45 cc. of water were added to this solution, which was then allowed to stand for 20 minutes at room temperature. The reaction mixture was thereafter diluted with water. The acidity was neutralized with sodium bicarbonate and the reaction mixture was extracted with methylene chloride. The extracts were evaporated to dryness to obtain 2.66 g. of an amorphous product composed for the greater part of 13β-ethyl-Δ$^{5(10),9(11)}$-gonadiene-3,17-dione.

Ultraviolet spectra (ethanol):

$\lambda_{max}$. 240–241 m$\mu$; $\epsilon$=14,750

EXAMPLE 12

PREPARATION OF 17α-ETHYNYL-13β-n-PROPYL-Δ$^{4,9,11}$-GONATRIENE-17β-OL-3-ONE 32.4 mg. of 17α - ethynyl-13β-n-propyl-Δ$^{5(10)9,(11)}$-gonadiene-17β-ol-3-one and 45 mg. of 2,3-dichloro-5,6-dicyano-p-benzoquinone were introduced into 4 cc. of benzene and agitated for 8 hours at room temperature. Thereafter, the reaction mixture was vacuum filtered and washed with benzene. The filtrate and the wash liquors were combined, agitated with N/10 sodium hyposulfite solution, then washed with water and evaporated to dryness. The residue was subjected to chromatography through magnesium silicate and eluted with methylene chloride containing 2% of acetone to obtain 21 mg. of 17α-ethynyl-13β-n-propyl - Δ$^{4,9,11}$ - gonatriene-17β-ol-3-one.

The utilization of 2,3-dibromo-5,6-cyano-p-benzoquinone instead of the corresponding dichloro derivative led to the same result.

The product showed a hypophysial inhibitory activity.

17α-ethynyl-13β-n-propyl - Δ$^{5(10),9(11)}$ - gonadiene-17β-ol-3-one, utilized as starting compound, may be prepared as follows:

(a) 1.3 g. of pyridinium perbromide were added to 1 g. of 17α - ethynyl-13β-n-propyl-Δ$^{5(10)}$-gonene-17β-ol-3-one, prepared according to U.S. Patent No. 3,136,790, in 20 cc. of anhydrous pyridine, and the reaction mixture was allowed to stand for 65 hours at room temperature. Thereafter, the mixture was cooled to +5° C. and 30 cc. of hydrochloric acid (concentrated hydrochloric acid diluted to half of its concentration) were added thereto. The precipitate was vacuum filtered, washed first with sodium bicarbonate solution, then with water. Next, it was dried, subjected to chromatography through magnesium silicate, eluted with pure methylene chloride and finally recrystallized from isopropyl ether.

Thus, 572 mg. of 17α-ethynyl-13β-n-propyl-Δ$^{4,9(10)}$-gonadiene-17β-ol-3-one were obtained, having a melting point of 162° C.

Ultraviolet spectra (ethanol):
$\lambda_{max}$. 304 m$\mu$; $\epsilon$=20,750

The product was white in color, insoluble in water, slightly soluble in isopropyl ether and soluble in ethanol and chloroform.

(b) 0.3 cc. of pyrrolidine were added to 250 mg. of 17α - ethynyl - 13β - n - propyl - Δ$^{4,9(10)}$ - gonadiene - 17β-ol-3-one dissolved in 2.5 cc. of methanol at the boiling point and the mixture was held at reflux for 10 minutes. Thereafter, the reaction mixture was evaporated to dryness under vacuum at a low temperature and 3-pyrrolidyl-17α - ethynyl - 13β - n - propyl - Δ$^{3,5(10),9(11)}$ - gonatriene-17β-ol was obtained, having a melting point of 92° C.

This product is insoluble in hexane and soluble in isopropyl ether.

This product is not described in the literature.

(c) The 3 - pyrrolidyl - 17α - ethynyl - 13β - propyl-Δ$^{3,5(10),9(11)}$-gonatriene-17β-ol was dissolved in 0.5 cc. of formic acid. After 1 minute, 10 cc. of water were added to the solution, which was then allowed to stand for 1 hour at a temperature of 5° C. The precipitate was vacuum filtered, washed with water and dried.

This product was subjected to chromatography through magnesium silicate and eluted with pure methylene chloride. By recrystallizations from hexane, 65 mg. of 17α-ethynyl - 13β - n - propyl - $\Delta^{5,(10),9(11)}$ - gonadiene - 17β-ol-3-one were obtained, having a melting point of 140° C. and a specific rotation $[\alpha]_D^{20} = +73°$ (c.=0.5% in methanol).

Ultraviolet spectra (ethanol):

$\lambda_{max}$. 241–242 m$\mu$; $\epsilon$=19,200

*Analysis.*—$C_{22}H_{28}O_2$; molecular weight=324.44. Calculated: C, 81.43%; H, 8.69%. Found: C, 81.3%; H, 8.5%.

The product occurred in the form of white crystals, insoluble in water and soluble in ethanol and benzene.

EXAMPLE 13

PREPARATION OF 17α-CHLOROETHYNYL-$\Delta^{4,9,11}$-ESTRATRIENE-17β-OL-3-ONE 50 mg. of 17α-chloroethynyl-$\Delta^{5(10),9(11)}$-estradiene-17β-ol-3-one (described in U.S. Patent No. 3,118,919), 63 mg. of 2,3-dichloro-5,6-dicyano-p-benzoquinone (being 2 mols) and 5 cc. of benzene were kept under agitation overnight at a temperature of 25° C. Thereafter, the reaction mixture was vacuum filtered. The filtrate obtained was washed first with an aqueous solution of N/10 sodium hyposulfite, then with water. The residue, brought to dryness, was subjected to chromatography through magnesium silicate eluted with methylene chloride and finally crystallized, to give 17α-chloro-ethynyl-$\Delta^{4,9,11}$-estratriene-17β-ol-3-one with a melting point of 192 to 194° C. This product was identical to that already described in the copending, commonly assigned U.S. Patent application Ser. No. 397,627, filed Sept. 18, 1964, abandoned in favor of Ser. No. 485,091, now Patent No. 3,257,278.

The utilization of 2,3-dibromo-5,6-dicyano-p-benzoquinone instead of the corresponding dichloro derivative led to the same result.

The 17α-chloroethynyl-$\Delta^{4,9,11}$-estratriene-17β-ol-3-one is endowed with a hypocholesterolemiant action, an inhibitory action of hypophysial secretions and an antizygotic action.

EXAMPLE 14

PREPARATION OF 13β-ETHYL-17α-METHYL-$\Delta^{4,9,11}$-GONATRIENE-17β-OL-3-ONE 115 mg. of 13β-ethyl-17α-methyl-$\Delta^{5(10),9(11)}$-gonadiene-17β-ol-3-one were dissolved in 9.5 cc. of benzene. A solution of 183 mg. of 2,3-dichloro-5,6-dicyano-p-benzoquinone in 5 cc. of anhydrous benzene was added thereto and the reaction mixture was agitated for 2 hours at room temperature. The precipitate formed was vacuum filtered, washed with benzene and the filtrate was extracted with benzene.

The extracts, washed first with 0.1 N sodium thiosulfate solution and then with water, were dried and distilled to dryness under vacuum. The resultant product was subjected to chromatography through magnesium silicate and eluted with methylene chloride containing 1.5% of acetone. The solution was evaporated to dryness to obtain 43 mg. of 13β - ethyl - 17α - methyl - $\Delta^{4,9,11}$ - gonatriene-17β-ol-3-one having a melting point of 154° C. and a specific rotation $[\alpha]_D^{20} = -42°$ (c.=0.7% in ethanol).

The product occurred in the form of prismatic needles, insoluble in water and dilute aqueous acids and alkalis, slightly soluble in ether, and soluble in alcohol, acetone, benzene and chloroform.

Ultraviolet spectra (ethanol):

$\lambda_{max}$. 343 m$\mu$; $E_{1cm}^{1\%}$=1,030; $\epsilon$=30,730

*Analysis.*—$C_{20}H_{26}O_2$; molecular weight=298.41. Calculated: C, 80.49%; H, 8.78%. Found: C, 80.6%; H, 8.7%.

The employment of 2,3-dibromo-5,6-dicyano-p-benzoquinone instead of the corresponding dichloro derivative led to the same result.

This compound possesses an important anabolisant activity.

13β - ethyl - 17α - methyl - $\Delta^{5(10),9(11)}$ - gonadiene - 17β-ol-3-one, utilized as starting compound, may be prepared in the following manner:

(a) Under agitation and under an atmosphere of nitrogen, 5.728 g. of 13β-ethyl-$\Delta^{4,9}$-gonadiene-17β-ol-3-one, prepared according to copending, commonly assigned U.S. Patent application Ser. No. 361,872, filed Apr. 22, 1964, and 100 mg. of p-toluene sulfonic acid were introduced into 100 cc. of methyl ethyl dioxolane, containing 1.8% of glycol, and the reaction mixture was heated at reflux for 1 hour.

Thereafter, 100 cc. of methyl ethyl dioxolane, containing 1.8% of glycol were added thereto and 100 cc. of solvent were eliminated by distillation within the period of 35 minutes.

The reaction mixture was cooled to room temperature, methylene chloride was added, and the mixture was then poured into a saturated solution of sodium bicarbonate. The organic phase was decanted. The aqueous phase was extracted with methylene chloride and the combined phases were dried, filtered and evaporated to dryness under vacuum.

The product obtained was subjected to chromatography through magnesium silicate. Elution with methylene chloride supplied 6.176 g. of 3 - ethylenedioxy - 13β - ethyl-$\Delta^{5(10),9(11)}$-gonadiene-17β-ol.

Ultraviolet spectra (ethanol):

$\lambda_{max}$. 242–243 m$\mu$; $E_{1cm}^{1\%}$=542; $\epsilon$=17,900

This compound was soluble in most of the usual organic solvents.

(b) 2.51 g. of 3-ethylenedioxy-13β - ethyl - $\Delta^{5(10),9(11)}$-gonadiene-17β-ol were dissolved in 420 cc. of anhydrous toluene. Next, 42 cc. of cyclohexanone were added to the solution, which was heated to reflux under an atmosphere of nitrogen, and within 1 hour 120 cc. of solvent were distilled therefrom.

Over a period of 6 hours a solution of 2.1 g. of aluminum isopropylate in 210 cc. of anhydrous toluene was added, while at the same time 200 cc. of solvent was eliminated by distillation. The reaction mixture was cooled to room temperature, then poured into a solution containing 7.5 g. of neutral potassium carbonate and 15 g. of the double salt to sodium and potassium tartrate in 150 cc. of water.

After agitation, the organic phase was decanted, next the aqueous phase was extracted with ether. The organic extracts were combined, washed with a saturated solution of sodium bicarbonate, dried, filtered and finally distilled to dryness under vacuum.

The residue was subjected to chromatography through magnesium silicate and eluted with methylene chloride furnishing the recovery of 1.9 g. of 3-ethylene-dioxy-13β-ethyl-$\Delta^{5(10),9(11)}$-gonadiene-17-one.

Ultraviolet spectra (ethanol):

$\lambda_{max}$. 242–243 m$\mu$; $E_{1cm}^{1\%}$=568; $\epsilon$=18,650

This compound is soluble in most of the organic solvents.

(c) 2 g. of freshly grated lithium were introduced into 80 cc. of anhydrous ethyl ether. Then under agitation a stream of methyl bromide was bubbled through the mixture, while cooling the same in an ice-water bath in such a fashion as to maintain a slight reflux. After the complete disappearance of the lithium, the agitation was continued for 30 minutes, then the mixture was cooled and decanted to obtain a solution of 2.6 N methyl lithium.

17.5 cc. of the methyl lithium solution, prepared as described above, were cooled to a temperature of 0° C. Then under agitation and under an atmosphere of nitrogen, a solution of 292 mg. of 3-ethylenedioxy-13β-ethyl-$\Delta^{5(10),9(11)}$-gonadiene-17-one in 18 cc. of anhydrous ethyl ether was added dropwise thereto. After maintaining the agitation for 4 hours, the reaction mixture was poured into 100 cc. of a saturated aqueous solution of iced ammonium chloride. Next, the organic phase was decanted and the aqueous phase was extracted with ethyl ether.

The extracts thus obtained were combined, washed with water, dried and distilled to dryness under vacuum. The residue was subjected to chromatography through magnesium silicate and eluted with methylene chloride containing 0.5% of acetone. The eluate was recovered and evaporated to dryness, thus obtaining 183 mg. of 3-ethylene-dioxy - 13$\beta$ - ethyl - 17$\alpha$ - methyl - $\Delta^{5(10),9(11)}$-gonadiene-17$\beta$-ol.

This product is insoluble in water and dilute aqueous acids and alkalis, and soluble in alcohol, ether, acetone, benzene and chloroform.

Ultraviolet spectra (ethanol):

$\lambda_{max.}$ 242–243 m$\mu$; $E_{1cm.}^{1\%}$=513; $\epsilon$=17,670

This compound is not described in the literature.

(d) 170 mg. of 3-ethylenedioxy-13$\beta$-ethyl-17$\alpha$-methyl-$\Delta^{5(10),9(11)}$-gonadiene-17$\beta$-ol were introduced into 2.3 cc. of acetic acid containing 25% of water and the mixture was agitated under an atmosphere of nitrogen at room temperature. After a contact time of 5 hours, the reaction mixture was poured into a saturated aqueous solution of sodium bicarbonate and then extracted with methylene chloride.

The extracts were washed with water, dried and evaporated to dryness under vacuum. 148 mg. of 13$\beta$-ethyl-17$\alpha$-methyl-$\Delta^{5(10),9(11)}$-gonadiene-17$\beta$-ol-3-one were obtained.

The product is insoluble in water and dilute aqueous acids and alkalis, and soluble in alcohol, ether, acetone, benzene and chloroform.

This compound is not described in the literature.

EXAMPLE 15

PREPARATION OF 17$\alpha$-ETHYL-$\Delta^{4,9,11}$-ESTRATRIENE-17$\beta$-OL-3-ONE At room temperature, 2.8 g. of 17$\alpha$-ethyl-$\Delta^{5(10),9(11)}$-estradiene-17$\beta$-ol-3-one were dissolved in 250 cc. of benzene. Next, 4.48 g. of 2,3-dichloro-5,6-dicyano-p-benzoquinone dissolved in 130 cc. of benzene were added thereto and the solution was allowed to stand under agitation for 3 hours. Thereafter, the reaction mixture was filtered and the insoluble component was washed with benzene. Next, the benzenic filtrate was treated with a solution of 0.1 N sodium hyposulfite and finally washed with water.

The filtrate was then dried over sodium sulfate, evaporated to dryness under vacuum, and the residue obtained was subjected to chromatography through silica gel. The fractions, eluted with methylene chloride containing 20% of ether, were combined and evaporated to dryness under vacuum. The residue was crystallized first from a mixture of isopropyl ether and methylene chloride (4:1), then from a mixture of isopropyl ether and methanol (5:1). 17$\alpha$-ethyl-$\Delta^{4,9,11}$-estratriene-17$\beta$-ol - 3 - one was obtained, having a melting point of 135° C. and a specific rotation $[\alpha]_D^{20}$=−87.5° (c.=0.46% in methanol). The yield from dehydrogenation was approximately 60%.

This product occurred in the form of prisms, insoluble in water and in dilute aqueous acids and alkalis slightly soluble in ethyl and isopropyl ether, and soluble in alcohol, acetone, benzene and chloroform.

*Analysis.*—$C_{20}H_{26}O_2$; molecular weight=298.40. Calculated: C, 80.49%; H, 8.78%. Found: C, 80.4%; H, 8.7%.

Ultraviolet spectra (ethanol):

$\lambda_{max.}$ 343 m$\mu$; $E_{1cm.}^{1\%}$=1,000; $\epsilon$=29,850

This compound is not described in the literature. It is endowed with a very interesting anabolisant activity.

The use of the 2,3-dibromo-5,6-dicyano-p-benzoquinone in place of the corresponding dichloro derivative led to the same result.

The 17$\alpha$-ethyl-$\Delta^{5(10),9(11)}$-estradiene-17$\beta$-ol-3-one utilized as starting compound may be prepared in the following manner:

(a) In the space of 2 hours, a solution composed of 180 cc. of ethyl bromide and 600 cc. of anhydrous ether was added to 30 g. of lithium in 1.2 liters of anhydrous ether. This addition brought the mixture to boiling. Reflux was maintained for 15 minutes longer after the introduction had been completed. The cooled solution had a concentration of about 0.35 N.

Under an atmosphere of nitrogen, in the space of 2 minutes, a solution of 10 g. of 3,3-dimethoxy-$\Delta^{5(10),9(11)}$-estradiene-3-one (described in Example 2) in 180 cc. of ether was added to 1.5 liters of the 0.35 N ethyl lithium solution, prepared as described above, and cooled to a temperature of −70° C. This solution was maintained under agitation for 1 hour at −70° C. Thereafter, the solution was poured over ice, containing a saturated solution of ammonium chloride. The organic phase was decanted and the aqueous phase was extracted with ether.

The organic extracts were washed with water until the wash waters were neutral, then dried and evaporated to dryness under vacuum. The crystallized residue was triturated in a mixture of equal volumes of ethyl ether and isopropyl ether. The crystals, which were vacuum filtered, were composed of 3,3-dimethoxy-17$\alpha$-ethyl-$\Delta^{5(10),9(11)}$-estradiene-17$\beta$-ol. The product obtained had a melting point of 128° C. and a specific rotation of $$[\alpha]_D^{20}=+130.4°$$

(c.=0.5% in methanol).

This product occurred in the form of colorless prisms, insoluble in water, very slightly soluble in isopropyl ether, slightly soluble in ethyl ether, and soluble in alcohol, acetone, benzene and chloroform.

Ultraviolet spectra (ethanol):

$\lambda_{max.}$ 242 m$\mu$; $E_{1cm.}^{1\%}$=596; $\epsilon$=20,650

This compound is not described in the literature.

(b) At room temperature, 3.2 g. of 3,3-dimethoxy-17$\alpha$-ethyl-$\Delta^{5(10),9(11)}$-estradiene-17$\beta$-ol were dissolved in 42 cc. of acetic acid containing 5% of water. Next, 20 cc. of water were added dropwise thereto and the agitation was maintained for 15 minutes after the addition was completed. The reaction mixture was poured into a saturated solution of sodium bicarbonate and extracted with methylene chloride. The extracts were washed with water until the wash waters were neutral, then dried and finally evaporated to dryness under vacuum at room temperature, thus supplying 2.8 g. of 17$\alpha$-ethyl-$\Delta^{5(10),9(11)}$-estradiene-17$\beta$-ol-3-one.

This compound is not described in the literature.

EXAMPLE 16

PREPARATION OF 17$\alpha$-ALLYL-$\Delta^{4,9,11}$-ESTRATRIENE-17$\beta$-OL-3-ONE 7 g. of 17$\alpha$-allyl-$\Delta^{5(10),9(11)}$-estradiene-17$\beta$-ol-3-one were dissolved in 210 cc. of methylene chloride under an atmosphere of nitrogen. 7 g. of 2,3-dichloro-5,6-dicyano-p-benzoquinone were added thereto, and the reaction mixture was agitated at room temperature overnight. Thereafter, the mixture was vacuum filtered. The filtrate was washed first with a solution of 1.75 g. of sodium metabisulfite and 0.7 g. of sodium bicarbonate in 60 cc. of water, then with water, dried, treated with animal charcoal, filtered, dried and finally evaporated to dryness under vacuum.

The residue was taken up with isopropyl ether heated to reflux. Crystallization was initiated by scratching; the solution was iced and vacuum filtered. After drying, 5 g. of 17$\alpha$-allyl-$\Delta^{4,9,11}$-estratriene-17$\beta$-ol-3-one were obtained which, after recrystallization from methyl ethyl ketone, had a melting point of 120° C. and a specific rotation $[\alpha]_D^{20}$=−72°±2° (c.=0.5% in ethanol).

Ultraviolet spectra (ethanol):

$\lambda_{max.}$ 342–343 m$\mu$; $\epsilon$=29,800

The product occurred in the form of prisms and is insoluble in water and dilute aqueous acids and alkalis, slightly soluble in isopropyl ether, and soluble in alcohol, acetone, benzene and chloroform.

*Analysis.*—$C_{21}H_{26}O_2$; molecular weight=310.42. Calculated: C, 81.25%; H, 8.44%. Found: C, 81.4%; H, 8.4%.

This compound possesses a progestomimetic, androgenic and anabolisant activity.

The use of 2,3-dibromo-5,6-dicyano-p-benzoquinone instead of the corresponding dichloro derivative led to the same result.

The 17α-allyl-$\Delta^{5(10),9(11)}$-estradiene-17β-ol-3-one, utilized as starting material, may be prepared in the following manner:

(a) 100 g. of anhydrous allyl bromide were dissolved in 600 cc. of ether, cooled to a temperature of 10° C. and 25 g. of magnesium turnings were introduced into 15 cc. of the solution obtained. Within the space of 1½ hours, the remainder of the ethereal solution of allyl bromide was added thereto while maintaining the temperature below 10° C. The agitation was continued for 45 minutes after the addition was completed. Thus, a solution of magnesium allyl bromide containing 1.2 mol/liter was obtained.

15 g. of 3,3-dimethoxy-$\Delta^{5(10),(11)}$-estradiene-17-one (described in Example 2) were dissolved in 80 cc. of anhydrous benzene. The benzenic solution was introduced into the magnesium allyl bromide solution, prepared as described above and cooled to −10° to −15° C. The reaction mixture was agitated for 1 hour, then poured into an iced solution of ammonium chloride. The organic phase was decanted and the aqueous phase was extracted with ether.

The organic phases were combined, washed with water, dried, filtered and evaporated to dryness without exceeding a temperature of 30° C. The residue was taken up with isopropyl ether and iced for ½ hour. The crystals were vacuum filtered, washed with isopropyl ether and dried. In this way, 12.7 g. of 3,3-dimethoxy-17α-allyl-$\Delta^{5(10),9(11)}$-estradiene-17β-ol were obtained. The product, after successive recrystallizations from ether, had a melting point of 138° C. and a specific rotation $$[\alpha]_D^{20} = +187° \pm 2°$$

(c.=1% in ethanol).

Ultraviolet spectra (ethanol):

$\lambda_{max.}$ 242 m$\mu$; $\epsilon$=20,800

This product occurred in the form of colorless prisms, insoluble in water, slightly soluble in ether, and soluble in alcohol, acetone, benzene and chloroform.

*Analysis.*—$C_{23}H_{34}O_3$; molecular weight=358.5. Calculated: C, 77.05%; H, 9.56%. Found: C, 77.0%; H, 9.5%.

This compound is not described in the literature.

(b) 15 g. of 3,3-dimethoxy-17α-allyl-$\Delta^{5(10),9(11)}$-estradiene-17β-ol were dissolved in 60 cc. of acetic acid containing 5% of water, under an atmosphere of nitrogen and the solution was agitated for 15 minutes, after which time more water was added progressively. Next, the reaction mixture was extracted with methylene chloride. The extracts obtained were washed first with a sodium bicarbonate solution, then with water and evaporated to dryness under vacuum. The residue was taken up with isopropyl ether. Crystallization was initiated by scratching. The solution was iced and vacuum filtered. The crystals were washed with isopropyl ether and dried. In this manner 17α-allyl-$\Delta^{5(10),9(11)}$-estradiene-17β-ol-3-one was obtained, having a melting point of 87° C. and a specific rotation of $[\alpha]_D^{20} = +189° \pm 2°$ (c.=0.5% in ethanol).

Ultraviolet spectra (ethanol):

$\lambda_{max.}$ 240 m$\mu$; $\epsilon$=19,700

The product occurred in the form of colorless prisms, insoluble in water and in dilute aqueous acids and alkalis, slightly soluble in isopropyl ether, and soluble in alcohol, acetone, benzene and chloroform.

*Analysis.*—$C_{21}H_{28}O_2$; molecular weight=312.42. Calculated: C, 80.73%; H, 9.03%. Found: C, 80.5%; H, 9.0%.

This compound is not described in the literature.

EXAMPLE 17

PREPARATION OF 17α,β-ACETOXY-D-HOMO-$\Delta^{4,9,11}$-ESTRATRIENE-3-ONE 1 g. of 17α,β-acetoxy-D-homo-$\Delta^{5(10),9(11)}$-estradiene-3-one was dissolved in 100 cc. of anhydrous benzene. Then a solution of 1.38 g. of 2,3-dichloro-5,6-dicyano-p-benzoquinone in 50 cc. of anhydrous benzene was added thereto, and the reaction mixture was agitated overnight at room temperature and under an atmosphere of nitrogen. The mixture was filtered. The resultant filtrate was treated with a solution of 0.1 N sodium thiosulfate until discolored, then washed with water, dried and finally evaporated to dryness under vacuum.

The residue obtained was subjected to chromatography through magnesium silicate with elution with methylene chloride containing increasing proportions of acetone, amounting to from 1 to 10%.

After evaporation of the eluate to dryness under vacuum and after recrystallization from methanol, 17-α,β-acetoxy-D-homo-$\Delta^{4,9,11}$-estratriene-3-one was obtained, having a melting point of 160° C.

The product occurred in the form of prisms insoluble in water and in dilute aqueous acids and alkalis, and soluble in methanol, ethanol, ether, acetone, benzene and chloroform.

The infrared spectra in chloroform showed the presence of a conjugated system at 1653 cm.$^{-1}$ and 1583 cm.$^{-1}$.

Ultraviolet spectra in ethanol:

$\lambda_{max.}$ 337 m$\mu$; $\epsilon$=29,000

*Analysis.*—$C_{21}H_{26}O_3$; molecular weight=326.42. Calculated: C, 77.26%; H, 8.03%. Found: C, 77.6%; H, 8.1%.

This compound is not described in the literature. The compound is endowed with an antiandrogenic activity.

The utilization of 2,3-dibromo-5,6-dicyano-p-benzoquinone in the place of the corresponding dichloro derivative led to the same result.

The saponification of this product carried out with the usual methods, for example, with methanolic sodium or potassium hydroxide, supplied the corresponding alcohol in the 17α position.

The 17-α,β-acetoxy-D-homo-$\Delta^{5(10),9(11)}$-estradiene-3-one, utilized as starting compound was prepared in the following manner and Table I is a flow diagram of the process.

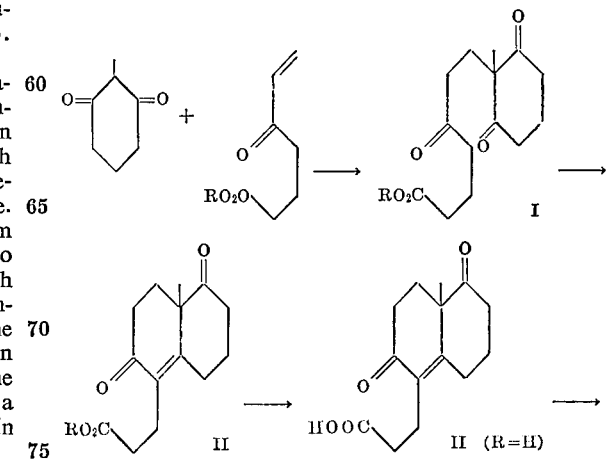

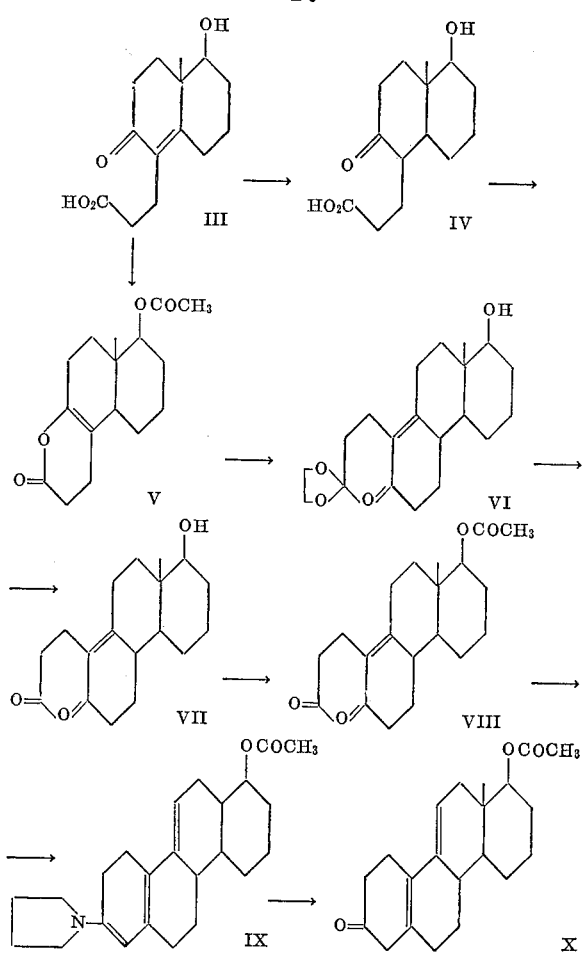

PREPARATION OF 17α,β-ACETOXY-D-HOMO-Δ⁵⁽¹⁰⁾,⁹⁽¹¹⁾-ESTRADIENE-3-ONE

Step A.—Preparation of 1,3-dioxo-2-methyl-2-(6'-carboalkoxy-3'-oxo-hexyl)-cyclohexane, I (1) 1,3 - dioxo - 2-methyl-2-(6'-carbomethoxy-3'-oxo-hexyl) - cyclohexane, I (R=—CH₃). 12.615 g. of 1,3-dioxo - 2 - methyl-cyclohexane, prepared according to Nazarov, Isv. Akad. Nauk SSSR (1952), 300 and 16.5 g. of anhydrous methyl-5-oxo-6-heptenoate, prepared according to Taylor, Soc. 1958, 3922, were placed in suspension in 30 cc. of methylene chloride and the suspension was agitated. Next, 27.2 cc. of triethylamine in 20 cc. of methylene chloride were introduced. 2.9 cc. of concentrated hydrochloric acid were added to the solution thus formed, and the reaction mixture was heated at reflux for 1½ hours.

Thereafter, the reaction mixture was cooled, washed successively first with water, then with dilute hydrochloric acid and again with water until the wash waters were neutral, and the organic phase recovered was dried and evaporated to dryness under vacuum. The residue was dissolved in ethyl ether. Crystallization was initiated by scratching and the crystallizing liquor was allowed to stand at room temperature, then iced. The crystals were vacuum filtered, washed with ether and dried, obtaining in this manner 22.46 g. of 1,3-dioxo-2-methyl-2-(6'-carbomethoxy-3'-oxo-hexyl)-cyclohexane (with R=—CH₃), having a melting point of 38° C.

The product obtained occurred in the form of colorless prisms, insoluble in water and in dilute aqueous acids and alkalis, soluble in alcohol, ether, acetone, benzene and chloroform.

Infrared spectra in carbon sulfide showed the presence of two maxima for the values 1697 cm.⁻¹ and 1727–1737 cm.⁻¹.

Analysis.—C₁₅H₂₂O₅: molecular weight =282.3. Calculated: C, 63.8%; H, 7.85%. Found: C, 64.1%; H, 8.0%.

This compound is not described in the literature.

(2) 1,3-dioxo-2-methyl-2-(6'-carbethoxy-3'-oxo-hexyl)-cyclohexane, I (R=—C₂H₅).

Under agitation, 1.294 g. of 1,3-dioxo-2-methylcyclohexane and 1.857 g. of anhydrous ethyl 5-oxo-6-heptenoate were introduced into 3 cc. of methylene chloride. Then 2.8 cc. of triethylamine and 0.3 cc. of concentrated hydrochloric acid were added to the suspension obtained, and the reaction mixture was heated at reflux for 1½ hours. Next, the reaction mixture was diluted with water and extracted with methylene chloride.

The organic phase was successively washed first with 0.1 N hydrochloric acid, then with water, dried and evaporated to dryness under vacuum. 2.499 g. of 1,3-dioxo - 2 - methyl-2-(6'-carbethoxy-3'-oxo-hexyl)-cyclohexane, I (R=—C₂H₅), were obtained which was soluble in most of the common organic solvents.

Step B.—Preparation of 1,6-dioxo-5-(2'-carboxy)-ethyl-8α - methyl - 1,2,3,4,6,7,8,8α - octahydronaphthalene, II (R=H).

(1) Cyclization.—465 g. of 1,3 - dioxo - 2 - (6'-carbomethoxy-3'-oxo-hexyl)-cyclohexane, I (R=—CH₃) were dissolved in 1.12 liters of anhydrous benzene. Next, under agitation and under an atmosphere of nitrogen, within a few minutes a solution, composed of 1.34 liters of anhydrous benzene, 183 cc. of acetic acid and 142 cc. of anhydrous piperidine, was added thereto, and the reaction mixture was heated at reflux for 100 hours. After the reaction mixture had been cooled, it was successively washed with water, then with a saturated aqueous solution of sodium bicarbonate and again with water; next it was dried and evaporated to dryness under vacuum.

The residue obtained was rectified. The fraction, distilling between 193 and 200° C. under a 0.3 mm. vacuum, was isolated, then taken up with methylene chloride. The solution was washed with a saturated aqueous solution of sodium bicarbonate, dried and finally evaporated to dryness under vacuum.

Thus, with a yield of approximately 50%, 1.6-dioxo-5-(2' - carbomethoxy) - ethyl - 8α-methyl-1,2,3,4,6,7,8,8α-octahydronaphthalene, II (R=—CH₃) was obtained. This product was used as such for the next step of the synthesis.

This compound is not described in the literature.

By starting with 1,3-dioxo-2-(6'-carbethoxy - 3 - oxohexyl)-cyclohexane, I (R=—C₂H₅) and by applying a working mode identical to that described above, 1,6-dioxo-5-(2'-carboxy)-ethyl-8α - methyl - 1,2,3,4,6,7,8,8α-octahydronaphthalene, II (R=—C₂H₅) was obtained (Boiling point 0.1 mm.=165° C.; boiling point 0.3 mm.=186° C.) The yield was approximately 52%.

This compound is described by Wieland et al., Helvetica 36, 376 (1953).

(2) Acid hydrolysis.—Under an atmosphere of nitrogen, 97 g. of 1,6-dioxo-5-(2'-carbethoxy)-ethyl-8α-methyl-1,2,3,4,6,7,8,8α-octahydronaphthalene

II (R=—C₂H₅)

were introduced into 970 cc. of 5 N hydrochloric acid, and the reaction mixture was heated under agitation at an interior temperature of 85° C. for 30 minutes.

After the reaction mixture was cooled, it was poured into water, then extracted with methylene chloride, dried and finally evaporated to dryness. The residue was triturated in iced ethyl ether, then it was allowed to stand for 3 hours at a temperature of −10° C. Next it was vacuum filtered, washed and dried.

After recrystallization from ethyl acetate, 57 g. of 1,6-dioxo-5-(2'-carboxy)-ethyl - 8α - methyl - 1,2,3,4,6,7,8,8α-octahydronaphthalene, II (R=H) were obtained. The product had a melting point of 115° C.

The product occurred in the form of colorless needles, very slightly soluble in water, soluble in alcohol, ether, acetone and cold chloroform as well as in hot benzene and hot ethyl acetate.

Ultraviolet spectra (ethanol):
$\lambda_{max}$. 251–252 m$\mu$; $\epsilon$=12,250

Analysis.—$C_{14}H_{18}O_4$; molecular weight=250.28. Calculated: C, 67.18%; H, 7.24%. Found: C, 67.2%; H, 7.2%.

This compound is not described in the literature.

In an analogous fashion, the acid hydrolysis of 1,6-dioxo-5(2'-carbomethoxy)-ethyl-8$\alpha$-methyl - 1,2,3,4,6,7,8, 8$\alpha$-octahydronaphthalene, II (R=—$CH_3$), following a mode of working identical to that described in the preceding, led also to 1,6-dioxo-5-(2'-carboxy)-ethyl-8$\alpha$-methyl-1,2,3,4,6,7,8,8$\alpha$-octahydronaphthalene, II (R=H).

Step C.—Preparation of 1$\beta$ - hydroxy-5-(2' - carboxy)-ethyl-6-oxo-8$\alpha$,$\beta$ - methyl - 1,2,3,4,6,7,8,8$\alpha$ - octahydronaphthalene, III 70 g. of 1,6-dioxo-5-(2'-carboxy)-ethyl-8$\alpha$-methyl-1,2,3,4,6,7,8,8$\alpha$-octahydronaphthalene, II (R=H), were introduced into 140 cc. of water. Next, while cooling the reaction mixture, 154 cc. of 2 N sodium hydroxide solution and 3.5 g. of sodium borohydride were added thereto. After the mixture had been allowed to stand for 20 minutes, 40 cc. of concentrated hydrochloric acid were slowly added. Next the reaction mixture was iced for 1 hour, then vacuum filtered. The precipitate was washed and dried, thus obtaining monohydrated 1$\beta$-hydroxy-5-(2'-carboxy)-ethyl-6-oxo-8$\alpha$,$\beta$ - methyl - 1,2,3,4,6,7,8,8$\alpha$-octahydronaphthalene, III, having a melting point of 70 to 80° C.

Ultraviolet spectra in ethanol:
$\lambda_{max}$. 250 m$\mu$; $\epsilon$=13,550

The product was triturated first in hot petroleum ether, then in ethyl acetate, and an anhydrous sample was obtained with a melting point of 132° C.

The product occurred in the form of colorless prisms, soluble in hot water, in the dilute aqueous alkalis, in alcohol and chloroform, and slightly soluble in dilute aqueous acids.

Analysis.—$C_{14}H_{20}O_4$; molecular weight=252.29. Calculated; C, 66.64%; H, 7.99%. Found: C, 66.9%; H, 8.0%.

This compound is not described in the literature.

The product was returned to the hydrated form by recrystallization of the anhydrous compound from the water.

Step D.—Preparation of 1$\beta$-hydroxy-5-(2'-carboxy)-ethyl-6-oxo-8$\alpha$,$\beta$-methyl-decahydronaphthalene, IV 36.83 g. of monohydrated 1$\beta$-hydroxy-5-(2'-carboxy)-ethyl - 6 - oxo - 8$\alpha$,$\beta$ - methyl-1,2,3,4,6,7,8,8$\alpha$-octahydronaphthalene, III, were introduced into 294 cc. of acetone and 73 cc. of water. 15 g. of a catalyst with a palladium hydroxide base, on a barium sulfate base, containing 0.7% of palladium, were added and a stream of hydrogen was allowed to bubble through the reaction mixture for 1½ hours. Thereafter, the catalyst was removed by filtration and was washed with acetone. The filtrate was evaporated to dryness under vacuum.

The residue was taken up with water and heated at reflux for 1 hour and then iced. The precipitate was vacuum filtered, washed with water and dried. In this manner 31.92 g. of 1$\beta$-hydroxy-5-(2'-carboxy)-ethyl-6-oxo-8$\alpha$,$\beta$-methyl-decahydronaphthalene, IV, were recovered with a melting point of 175 to 182° C.

The product occurred in the form of colorless needles, soluble in hot water, in dilute aqueous alkalis and in alcohol, slightly soluble in ether, acetone and benzene, and insoluble in chloroform.

Analysis.—$C_{14}H_{22}O_4$; molecular weight=254.32. Calculated: C, 66.11%; H, 8.72%. Found: C, 65.8%; H, 8.6%.

This compound is not described in the literature.

Step E.—Preparation of the acetate of the enolic lactone of the acid 1$\beta$-hydroxy-5-(2'-carboxy)-ethyl-6-oxo-8$\alpha$,$\beta$-methyl-decahydronaphthalene, V Under an atmosphere of nitrogen, 31.9 g. of 1$\beta$-hydroxy-5-(2'-carboxy)-ethyl-6-oxo-8$\alpha$,$\beta$ - methyl - decahydronaphthalene, IV, were introduced into 121 cc. of acetyl chloride and the reaction mixture was heated at reflux for 1 hour.

Thereafter, the mixture was evaporated to dryness under vacuum to obtain 36.26 g. of the acetate of the enolic lactone of the acid 1$\beta$-hydroxy-5-(2'-carboxy)ethyl-6-oxo-8$\alpha$,$\beta$-methyl-decahydronaphthalene. V.

The product was used as such for the next step in the synthesis.

This compound is not described in the literature.

Step F.—Preparation of 3-ethylenedioxy-4,5-seco-D-homo-$\Delta^9$-estrene-17$\alpha$,$\beta$-ol-5-one, VI Under an atmosphere of nitrogen 36.2 g. of the acetate of the enolic lactone of the acid 1$\beta$-hydroxy-5-(2'-carboxy)-ethyl-6-oxo-8$\alpha$,$\beta$-methyl-decahydronaphthalene, V, were dissolved in 350 cc. of anhydrous tetrahydrofuran. The solution obtained was cooled to a temperature between $-60°$ and $-70°$ C. Then, within the space of 1 hour, 244 cc. of a 0.8 M solution of 4-ethylene-dioxy-n-pentyl magnesium bromide in tetrahydrofuran were introduced. The reaction mixture was then agitated for 5 minutes at a low temperature. Thereafter, the reaction mixture was diluted with water. The tetrahydrofuran was eliminated by distillation under vacuum. Next, 195 cc. of a methanolic 10% potassium hydroxide solution were added and the reaction mixture was heated at reflux for 1 hour. The mixture was allowed to stand overnight at room temperature, thereafter filtered and washed with methanol.

The filtrate was extracted with methylene chloride, washed with water, dried and evaporated to dryness under vacuum, thus obtaining a residue. A second treatment of this residue by a methanolic 10% potassium hydroxide solution, identical to the preceding, followed by extraction with methylene chloride, gave on isolation after evaporation to dryness under vacuum, 20.38 g. of 3-ethylenedioxy-4,5-seco-D-homo-$\Delta^9$-estrene-17$\alpha$,$\beta$-ol - 5 - one, VI, which after recrystalliaztion from isopropyl ether, had a melting point of 109° C.

The product occurred in the form of colorless prisms, insoluble in water and in dilute aqueous acids and alkalis, and soluble in most of the usual organic solvents.

Infrared spectra in chloroform showed the presence of a conjugated ketone, 1665 cm.$^{-1}$ for the ketonic group and 1610 cm.$^{-1}$ for the double bond.

Ultraviolet spectra in ethanol:
$\lambda_{max}$. 251 m$\mu$; $\epsilon$=14,850

Analysis.—$C_{21}H_{32}O_4$; molecular weight=348.47. Calculated: C, 72.37%; H, 9.26%. Found: C, 72.2%. H, 9.2%.

This compound is not described in the literature.

Step G.—Preparation of 4,5-seco-D-homo-$\Delta^9$-estrene-17$\alpha$,$\beta$-ol-3,5-dione, VII 19.38 g. of 3-ethylenedioxy-4,5-seco - D - homo - $\Delta^9$-estrene-17$\alpha$,$\beta$-ol-5-one, VI were introduced into 970 cc. of 40% aqueous acetic acid. The solution was agitated for 1 hour at an interior temperature of 60° C. Thereafter, the reaction mixture was cooled to room temperature and extracted with methylene chloride.

The organic phase was successively washed with water, then with a saturated solution of sodium bicarbonate and again with water until the wash waters were neutral, then dried and evaporated to dryness under vacuum.

Thus 14.05 g. of 4,5-seco-D-homo-$\Delta^9$-estrene-17$\alpha$,$\beta$-ol-3,5-dione, VII, were obtained. The product was used as such for the next step of the synthesis.

The product was soluble in most of the usual organic solvents.

Infrared spectra in chloroform showed the presence of a hydroxyl group, of a nonconjugated ketone at 1713 cm.$^{-1}$ and a conjugated ketone, 1660 cm.$^{-1}$ for the ketonic group and 1607 cm.$^{-1}$ for the double bond.

This compound is not described in the literature.

Step H.—Preparation of 17α,β-acetoxy-4,5-seco-D-homo-Δ⁹-estrene-3,5-dione, VIII 2.3 g. of 4,5-seco-D-homo-Δ⁹-estrene - 17α,β - ol - 3,5-dione, VII were dissolved in 23 cc. of anhydrous pyridine. Next, while agitating the solution under an atmosphere of nitrogen, 9 cc. of acetic acid anhydride were added thereto. The agitation was kept up for 1 hour at a temperature of 60° C. Thereafter, the reaction mixture was poured into iced water, agitated for 3 hours, then vacuum filtered. The precipitate was washed with water and dried.

The recrystallization of the residue from a mixture of isopropyl ether and petroleum ether (fraction distilling between 60° C. and 80° C.) in a proportion of 1:3, furnished 1.771 g. of 17α,β-acetoxy-4,5-seco-D-homo-Δ⁹-estrene-3,5-dione VIII with a melting point of 85° C.

The product occurred in the form of colorless needles, insoluble in water and in dilute aqueous acids and alkalis, and soluble in most of the common organic solvents.

Infrared spectra in chloroform showed the presence of a conjugated ketone with values of 1665 cm.$^{-1}$ and 1612 cm.$^{-1}$, and of an acetate of which the carbonyl group was shown at 1255 cm.$^{-1}$.

Ultraviolet spectra in ethanol:
$\lambda_{max}$. 250 mμ; ε=15,000

*Analysis.*—C$_{21}$H$_{30}$O$_4$; molecular weight=346.45. Calculated: C, 72.8%; H, 8.73%. Found: C, 73%; H, 8.5.

This compound is not described in the literature.

Step I.—Preparation of 3-pyrrolidyl-17α,β-acetoxy-D-homo-Δ³,⁵⁽¹⁰⁾,⁹⁽¹¹⁾-estratriene, IX Under an atmosphere of nitrogen 12.55 g. of 17α,β-acetoxy-4,5-seco-D-homo-Δ⁹-estrene-3,5-dione, VIII were introduced into 25 cc. of anhydrous pyrrolidine. The solution was heated under agitation for 1 hour at approximately 85–90° C.

Thereafter, 250 cc. of methanol were added. Next, the reaction mixture was iced for 15 minutes, then vacuum filtered. The residue was washed with methanol, dried under vacuum in total absence of light to obtain 9.26 g. of 3 - pyrrolidyl - 17α,β - acetoxy - D - homo-Δ³,⁵⁽¹⁰⁾,⁹⁽¹¹⁾ - estratriene, IX, having a melting point of 185–186° C.

The product occurred in the form of needles, slightly soluble in alcohol and soluble in chloroform.

Infrared spectra in chloroform showed the presence of an enamine group by the following peaks: 1630 cm.$^{-1}$, 1615 cm.$^{-1}$ and 1563 cm.$^{-1}$.

This compound is not described in the literature.

Step J.—Preparation of 17α,β-acetoxy-D-homo-Δ⁵⁽¹⁰⁾,⁹⁽¹¹⁾-estradiene-3-one, X

Under an atmosphere of nitrogen, 9.15 g. of 3-pyrrolidyl - 17α,β - acetoxy - D - homo - Δ³,⁵⁽¹⁰⁾,⁹⁽¹¹⁾-estratriene, IX, were dissolved in 18.5 cc. of acetic acid. The solution obtained was then poured into water and agitated for 1 hour at about 0° C. and thereafter vacuum filtered. The residue was washed and dried, then dissolved in methylene chloride and passed through a column of magnesium silicate.

The resultant filtrate was crystallized from a minimum amount of isopropyl ether, thus obtaining 4.274 g. of 17α,β - acetoxy - D - homo - Δ⁵⁽¹⁰⁾,⁹⁽¹¹⁾-estradiene-3-one, X, having a melting point of 126° C.

The product occurred in the form of needles insoluble in water and in dilute aqueous acids and alkalis, and soluble in alcohol, acetone, benzene and chloroform.

Ultraviolet spectra in ethanol:
$\lambda_{max}$. 240 mμ; ε=19,400

*Analysis.*—C$_{21}$H$_{28}$O$_3$; molecular weight=328.43. Calculated: C, 76.79%; H, 8.59%. Found: C, 77.0%; H, 8.6%.

This compound is not described in the literature.

EXAMPLE 18

PREPARATION OF 7α,17α-DIMETHYL-Δ⁴,⁹,¹¹-ESTRATRIENE-17β-OL-3-ONE

Under agitation and under an atmosphere of nitrogen, 1.6 g. of 7α,17α - dimethyl - Δ⁵⁽¹⁰⁾,⁹⁽¹¹⁾ - estradiene-17β - ol - 3 - one was dissolved in 32 cc. of anhydrous dioxane, then 2.4 g. of 2,3 - dichloro - 5,6 - dicyano-p-benzoquinone were added thereto, and the reaction mixture was allowed to stand for 28 hours at room temperature. Thereafter, the mixture was filtered, and the filtrate was washed first with a saturated aqueous solution of sodium bicarbonate and then with water. The organic phase was dried and evaporated to dryness. The residue was taken up with methylene chloride and filtered through magnesium silicate.

The filtrate, evaporated to dryness, was subjected to chromatography through magnesium silicate with elution with methylene chloride containing 2% of acetone.

The eluate was evaporated to dryness. The residue was crystallized from ethanol and supplied 175 mgm. of 7α, 17α - dimethyl - Δ⁴,⁹,¹¹ - estratriene - 17β - ol - 3 - one. This product had a melting point of 173° C. and a specific rotation $[\alpha]_D^{20}$=—125° (c.=0.57% in methanol).

The product occurred in the form of prisms, insoluble in water and in dilute aqueous acids and alkalis, and soluble in most of the common organic solvents.

*Analysis.*—C$_{20}$H$_{26}$O$_2$; molecular weight=298.41. Calculated: C, 80.49%; H, 8.78%. Found: C, 80.5; H, 8.7%.

Ultraviolet spectra (ethanol):
$\lambda_{max}$. 343 mμ; ε=27,800

This compound is not described in the literature.

The utilization of 2,3 - dibromo - 5,6 - dicyano-p-benzoquinone instead of the corresponding dichloro derivative led to the same result.

7α,17α - dimethyl - Δ⁴,⁹,¹¹ - estratriene - 17β - ol-3-one is endowed with a very marked androgenic and anabolisant activity.

The 7α,17α - dimethyl - Δ⁵⁽¹⁰⁾,⁹⁽¹¹⁾-estradiene-17β-ol - 3-one, used as starting compound, was prepared in the following manner and Table II is a flow diagram of this process.

TABLE II

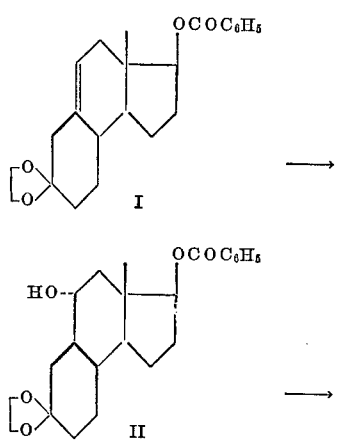

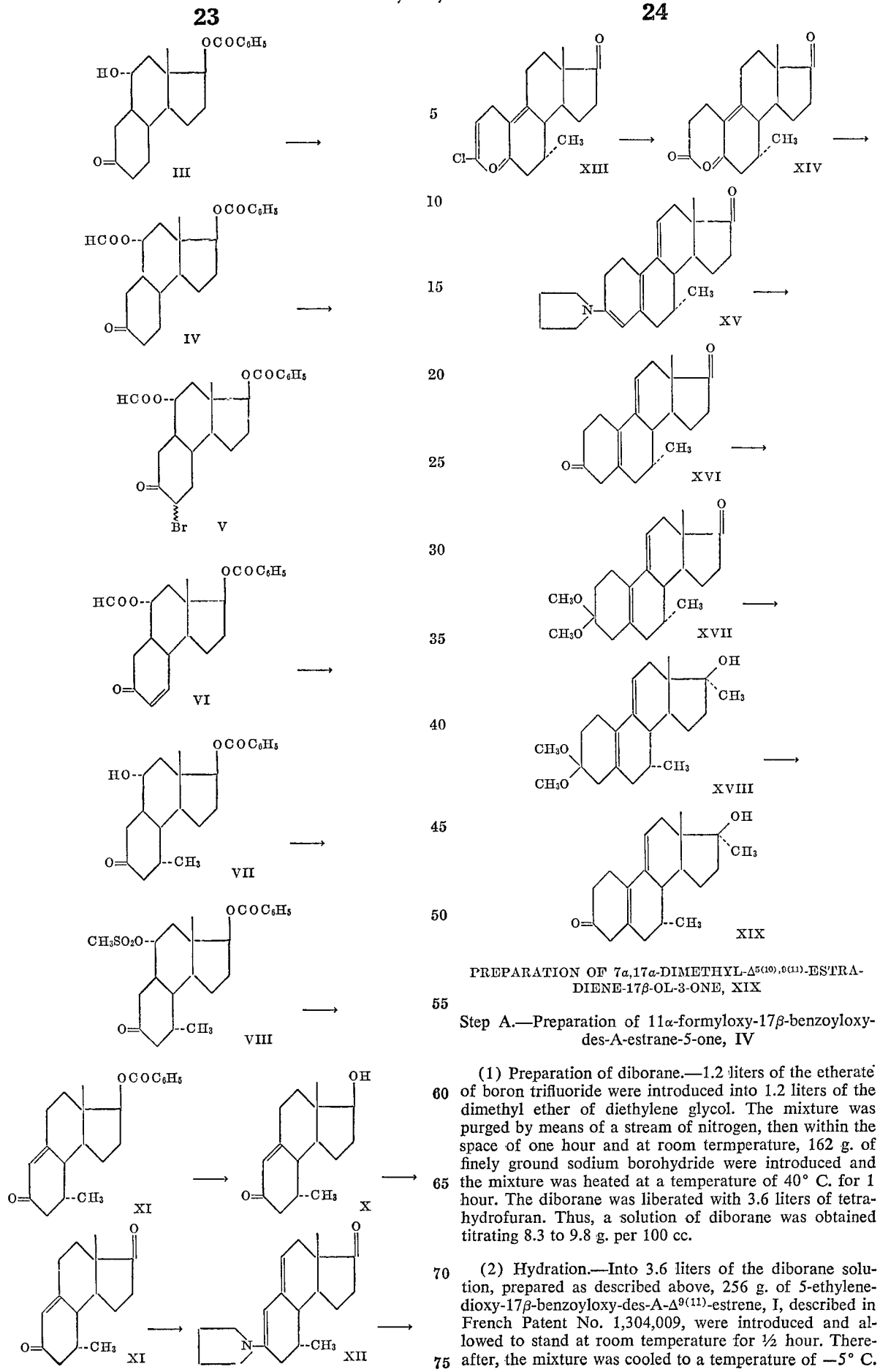

PREPARATION OF 7α,17α-DIMETHYL-Δ$^{5(10),9(11)}$-ESTRA-DIENE-17β-OL-3-ONE, XIX

Step A.—Preparation of 11α-formyloxy-17β-benzoyloxy-des-A-estrane-5-one, IV (1) Preparation of diborane.—1.2 liters of the etherate of boron trifluoride were introduced into 1.2 liters of the dimethyl ether of diethylene glycol. The mixture was purged by means of a stream of nitrogen, then within the space of one hour and at room termperature, 162 g. of finely ground sodium borohydride were introduced and the mixture was heated at a temperature of 40° C. for 1 hour. The diborane was liberated with 3.6 liters of tetrahydrofuran. Thus, a solution of diborane was obtained titrating 8.3 to 9.8 g. per 100 cc.

(2) Hydration.—Into 3.6 liters of the diborane solution, prepared as described above, 256 g. of 5-ethylenedioxy-17β-benzoyloxy-des-A-Δ$^{9(11)}$-estrene, I, described in French Patent No. 1,304,009, were introduced and allowed to stand at room temperature for ½ hour. Thereafter, the mixture was cooled to a temperature of —5° C.

Slowly 350 cc. of water were added thereto followed by the addition of the following mixture:

|  | Cc. |
|---|---|
| Sodium hydroxide sol. 36° Bé | 350 |
| Water | 350 |
| Ethanol | 1050 |

Next, 1.8 liters of 110 volume hydrogen peroxide were slowly added to the reaction mixture and the mixture was agitated for 1 hour at a low temperature. The mixture was then poured into a saturated aqueous solution of sodium chloride and the liquid phase was extracted with methylene chloride. The extracts were washed with a saturated solution of sodium chloride and with water, then dried and evaporated to dryness under vacuum. The residue obtained was purified by trituration in isopropyl ether, thus obtaining 213.5 g. of 5-ethylenedioxy-17β-benzoyloxy-des-A-estrane-11α-ol, II. The product obtained had a melting point of 152° C. and a specific rotation $[\alpha]_D^{20}=+29°$ (c.=1% in chloroform).

The product is colorless, insoluble in water and slightly soluble in isopropyl ether.

This compound is not described in the literature.

(3) Hydrolysis.—330 g. of 5-ethylenedioxy-17β-benzoyloxy-des-A-estrane-11α-ol, II, were dissolved in 1,650 cc. of ethanol while heating at a temperature of 60° C. Then 330 cc. of N hydrochloric acid were introduced into the solution, which was heated at reflux for ½ hour under agitation. Thereafter, the solution was cooled to room temperature, poured into water and extracted with methylene chloride.

The extracts were washed first with a saturated aqueous solution of sodium bicarbonate, then with water dried, vacuum filtered, again washed with water and evaporated to dryness. The residue was dissolved in anhydrous ether under reflux and the crystallization was initiated. The crystallizing mixture was left in the refrigerator overnight, then vacuum filtered. The crystals were washed with ether and dried.

240 g. of 17β-benzoyloxy-des-A-estrane-11α-ol-5-one, III, were obtained, having a melting point of 129–130° C.

The product was colorless, insoluble in water and in dilute aqueous acids and alkalis, and soluble in alcohol and ether.

The compound is not described in the literature.

(4) Formylation.—2.5 g. of 17β-benzoyloxy-des-A-estrane-11α-ol-5-one, III, were introduced into 12.5 cc. of 98% formic acid and the solution was heated for ½ hour at a temperature of 80° C. After the solution had been cooled, it was poured into a water-ice mixture, agitated for several minutes, then vacuum filtered. The residue was washed with water and dried under vacuum.

The residue obtained was recrystallized from isopropanol, and about 2.5 g. of 11α-formyloxy-17β-benzoyloxy-des-A-estrane-5-one, IV, were obtained. The product had a melting point of 135° C. and a specific rotation $[\alpha]_D^{20}=+10.7°$ (c.=0.7% in methanol) and +8.6° (c.=0.44% in chloroform).

The product was colorless, insoluble in water and in dilute aqueous acids. It was recrystallized from isopropanol and isopropyl ether.

*Analysis.*—$C_{22}H_{26}O_5$; molecular weight=370.43. Calculated: C, 71.33%; H, 7.07%. Found: C, 71.6%; H, 7.1%.

This compound is not described in the literature.

Step B.—Preparation of 11α-formyloxy-17β-benzoyloxy-des-A-Δ⁶-estrene-5-one, VI (1) Bromination.—At room temperature, 100 g. of 11α-formyloxy-17β-benzoyloxy-des-A-estrane-5-one, IV, were dissolved in 1 liter of anhydrous dioxane. Within the space of 5 minutes, 460 cc. of a solution containing 10% of bromine in dioxane were added thereto, and the solution was agitated for several minutes after the introduction had been completed.

Thereafter, the solution was poured over an ice-water mixture, agitated and vacuum filtered. The residue was washed with water and dried under vacuum. Thus, 122 g. of 6-bromo-11α-formyloxy-17β-benzyloxy-des-A-estrane-5-one, V, were obtained. The product had a melting point of about 94° C. and was used as such for the following step. This compound is not described in the literature.

(2) Dehydrobromination.—122 g. of lithium bromide and 244 g. of lithium carbonate were introduced into 1,220 cc. of anhydrous dimethylformamide. 122 g. of 6-bromo-11α-formyloxy-17β-benzoyloxy-des-A-estrane-5-one, V, obtained in the preceding, were added and the suspension was heated at about 106° C. for 3 hours under agitation.

Thereafter, the reaction mixture was cooled to room temperature and poured into the following mixture:

| Water | liters | 12 |
|---|---|---|
| Acetic acid | cc. | 300 |
| Sodium chloride | g. | 160 | and agitated for ¼ hour.

The reaction mixture was then vacuum filtered. The residue was washed with water, taken up in methylene chloride and filtered. The organic phase was washed with water, dried and evaporated to dryness under vacuum. The residue was triturated in anhydrous ether, iced overnight, then vacuum filtered. The residue was washed with ether and dried under vacuum.

After recrystallization from an ethyl acetate-isopropyl ether mixture, 45.9 g. of 11α-formyloxy-17β-benzoyloxy-des-A-Δ⁶-estrene-5-one, VI, were obtained. The product had a melting point of 137–138° C. and a specific rotation $[\alpha]_D^{20}=-19.2°$ (c.=0.9% in chloroform).

The product was insoluble in water and in dilute aqueous acids and alkalis, slightly soluble in isopropyl ether, and soluble in alcohol and ethyl acetate.

This compound is not described in the literature.

Step C.—Preparation of 17β-benzoyloxy-7α-methyl-des-A-estrane-11α-ol-5-one, VII 70 mg. of cuprous chloride were introduced into a solution of 7 millimoles of methyl magnesium bromide in 15 cc. of tetrahydrofuran. The reaction mixture was agitated for ¼ hour, cooled to a temperature of 0° C. and within the space of 2 minutes, 2 millimoles of 11α-formyloxy-17β-benzoyloxy-des-A-Δ⁶-estrene-5-one, VI, dissolved in 6 cc. of tetrahydrofuran, were added thereto. The agitation was maintained at low temperature for several minutes, then the reaction mixture was poured into a mixture of water, ice and hydrochloric acid. Thereafter the mixture was extracted with methylene chloride. The extracts thus obtained were washed with water, dried and distilled to dryness under vacuum.

By subjecting the residue to chromatography through magnesium silicate and by elution with methylene chloride containing 0.5% of methanol, 194 mg. of 17β-benzoyloxy-7α-methyl-des-A-estrane-11α-ol-5-one, VII, were isolated. This product had, after recrystallization from a 2:4 mixture of ethyl acetate and isopropyl ether, a melting point of 155–156° C. and a specific rotation
$[\alpha]_D^{20}=+20°$ (c.=0.75% in chloroform).

The product occurred in the form of small colorless rods, slightly soluble in ether, and soluble in acetone, benzene and chloroform.

*Analysis.*—$C_{22}H_{28}O_4$; molecular weight=356.44. Calculated: C, 74.13%; H, 7.92%. Found: C, 74.0%; H, 8.0%.

This compound is not described in the literature.

The structure of 17β-benzoyloxy-7α-methyl-des-A-estrane-11α-ol-5-one, VII, was confirmed by reducing the same to 17β-benzoyloxy-7α-methyl-des-A-estrane-5α,11α-diol, prepared as described in the following:

0.356 g. of 17β-benzoyloxy-7α-methyl-des-A-estrane-11α-ol-5-one was dissolved in 8 cc. of ethanol. 0.35 g. of Raney nickel containing 2% of palladium was added to the solution, which was then purged and agitated for a period of 6 hours under an atmosphere of hydrogen and at room temperature.

Thereafter, the catalyst was eliminated by filtration. The filtrate was distilled to dryness under vacuum, and the residue was crystallized by the addition of a few drops of ether.

After trituration in isopropyl ether and after recrystallization from ethyl acetate, 0.178 g. of 17β-benzoyloxy-7α-methyl-des-A-estrane-5α,11α-diol was obtained, having a melting point of 154° C. and a specific rotation $[\alpha]_D^{20} = +3.7°$ (c.=0.8% in chloroform).

The RMN spectra confirmed the α configuration of the methyl in the 7 position.

The product was colorless, slightly soluble in ether, and soluble in alcohol, acetone, benzene and chloroform.

This compound is not described in the literature.

17β-benzoyloxy-7α-methyl-des-A-estrane-11α-ol-5-one, VII, may also be prepared by starting with 17β-benzoyloxy-Δ⁶-estrene-11α-ol-5-one, obtained by saponification of the corresponding formiate. The work is carried out in the following manner:

1 g. of 11α-formyloxy-17β-benzoyloxy-des-A-Δ⁶-estrene-5-one, VI, was introduced into 15 cc. of methanol and the solution was heated to reflux. Next, 5 cc. of a normal aqueous solution of potassium bicarbonate were rapidly added thereto, and the temperature was maintained for 5 minutes at about 70° C. Thereafter, the reaction mixture was cooled, neutralized by the addition of acetic acid, diluted with water and extracted with methylene chloride.

The extracts were successively washed first with water, then with an aqueous solution of sodium chloride, dried and distilled to dryness. 17β-benzoyloxy-des-A-Δ⁶-estrene-11α-ol-5-one was obtained which product was utilized as such in the next step of the synthesis.

100 mg. of cuprous chloride were introduced into a solution of 0.99 N methyl magnesium bromide in tetrahydrofuran. The reaction mixture was agitated for ¼ hour at room temperature, diluted by addition of tetrahydrofuran and then rapidly cooled to a temperature of —4° C. Next, 2.05 g. of 17β-benzoyloxy-des-A-Δ⁶-estrene-11α-ol-5-one were added, and the agitation was maintained for 15 minutes after the introduction had been completed.

The reaction mixture was poured into ice water containing concentrated hydrochloric acid, and extracted with methylene chloride. The extracts were successively washed first with water, then with an aqueous solution of sodium chloride, dried and distilled to dryness under vacuum. The residue was subjected to chromatography through magnesium silicate, followed by elution with methylene chloride containing 0.3% of methanol. In this manner, 1.2 g. of a crystallize product was obtained.

The recrystallization of the product obtained from methylene chloride with addition of a 2:1 mixture of ether and isopropyl ether furnished 1.07 g. of 17β-benzoyloxy-7α-methyl-des-A-estrane-11α-ol-5-one, VII, identical to the product described above.

Step D.—Preparation of 17β-benzoyloxy-7α-methyl-des-A-Δ⁹-estrene-5-one, IX (1) Esterification.—0.865 g. of 17β-benzoyloxy-7α-methyl-des-A-estrane-11α-ol-5-one, VII, was dissolved in 5.2 cc. of anhydrous pyridine. The solution was cooled to about 0° C., then 0.52 cc. of methane-sulfonyl chloride was added dropwise thereto. The reaction mixture was then agitated for 2 hours at the low temperature, then for 2 more hours at room temperature.

After dilution with water, the reaction mixture was allowed to stand for 1 hour at room temperature, then vacuum filtered. The residue was washed with water and dried under vacuum. 1.037 g. of 11α-methanesulfonyloxy-17β-benzoyloxy-7α-methyl-des-A-estrane-5-one, VIII, was obtained, which, after recrystallization from ethanol, had a melting point of 214–215° C.

The product occurred in the form of colorless needles, slightly soluble in alcohol and soluble in chloroform.

This compound is not described in the literature.

(2) Dehydration.—2.36 g. of 11α-methanesulfonyloxy-7α-methyl-17β-benzoyloxy-des-A-estrane-5-one, VIII, and 3.95 g. of lithium bromide were introduced into 35 cc. of anhydrous dimethylformamide, and the mixture was agitated for 5 hours at a temperature of 120° C. Thereafter, it was cooled, poured into water, agitated for ½ hour and vacuum filtered. The residue was washed with water and dried under vacuum.

The resultant product, successively triturated first in ether and then in ethyl acetate, supplied 1.412 g. of 17β-benzoyloxy-7α-methyl-des-A-Δ⁹-estrene-5-one, IX, which, after recrystallization from ethyl acetate, had a melting point of 182–183° C., then 200° C., after having recrystallized, and a specific rotation $[\alpha]_D^{20} = +49.6°$ (c.=0.48% in chloroform).

Ultraviolet spectra (ethanol):
$\lambda_{max.}$ 236 mμ; ε=26,200

Infrared spectra (chloroform):
Presence of a ketonic group at 1,667 cm.⁻¹,
Presence of a double bond at 1,615 cm.⁻¹
Presence of a benzoate group at 1,712 cm.⁻¹.

The product occurred in the form of small colorless rods, insoluble in water, very slightly soluble in ether, slightly soluble in alcohol and soluble in chloroform.

Analysis.—$C_{22}H_{26}O_3$; molecular weight=338.43. Calculated: C, 78.07%; H, 7.74%. Found: C, 78.1%; H, 7.8%.

This compound is not described in the literature.

17β-benzoyloxy-des-A-Δ⁶-estrene-11α-ol-5-one can also be prepared by starting with 17β-benzoyloxy-des-A-estrane-11α-ol-5-one, III. The work is accomplished in the following manner:

(a) Bromination.—3 g. of 17β-benzoyloxy-des-A-estrane-11α-ol-5-one, III, were dissolved in 30 cc. of anhydrous chloroform. The solution cooled to about 5° C. Next, under agitation, 9.5 cc. of a solution prepared by starting with 15.25 g. of bromine in 100 cc. of anhydrous chloroform were introduced dropwise while cooling to 0° C. The agitation was maintained for several minutes after the introduction had been completed. Then, the reaction mixture was poured into water, decanted and extracted with methylene chloride.

The extracts were successively washed first with a saturated aqueous solution of sodium bicarbonate, then with water and lastly with an aqueous solution of sodium chloride, and distilled to dryness under vacuum. The residue was taken up with ether and allowed to stand for several hours at room temperature. Thereafter, the residue was vacuum filtered, washed with ether and triturated in ethyl acetate.

Thus, 1 g. of 6β-bromo-17β-benzoyloxy-des-A-estrane-11α-ol-5-one was obtained with a melting point of 225–228° C. and a specific rotation $[\alpha]_D^{20} = -160°$ (c.=0.8% in chloroform).

The product was colorless, slightly soluble in ether and soluble in chloroform.

This compound is not described in the literature.

(b) Dehydrobromination.—A mixture consisting of:

Lithium bromide _____ g__ 1
Lithium carbonate _____ g__ 2
Dimethylformamide _____ cc__ 10 was heated to a temperature of 100° C. Then 1 g. of 6β-bromo-17β-benzoyloxy-des-A-estrane-11α-ol-5-one was introduced into this mixture and agitated for 3 hours at about 100° C. Thereafter, the reaction mixture was poured into a mixture of water, ice and acetic acid. Sodium chloride was added thereto and the mixture was agitated for ½ hour. The aqueous phase was decanted and the resultant residue was dissolved in methylene chloride.

The solution was successively washed first with an aqueous solution of sodium bicarbonate, then with water and lastly with an aqueous solution of sodium chloride, then dried and distilled to dryness under vacuum. The product thus obtained was subjected to chromatography through silica gel and eluted with methylene chloride containing increasing percentages of methanol.

The fraction eluted with methylene chloride containing 1.5% of methanol was recovered, and 0.68 g. of 17β-benzoyloxy-des-A-$\Delta^6$-estrene-11α-ol-5-one was isolated.

The product was colorless, slightly soluble in ether and isopropyl ether, soluble in ethyl acetate and alcohols.

Infrared spectra (chloroform):
   Presence of a free hydroxyl and of a ketonic group at 1,670 cm.$^{-1}$.
Ultraviolet spectra (ethanol):
   $\lambda_{max.}$ 230–231 m$\mu$; $\epsilon$=23,000
   $\lambda_{max.}$ 273–274 m$\mu$; $\epsilon$=1,020
   $\lambda_{max.}$ 280–281 m$\mu$; $\epsilon$=780

This compound is identical to that described in Step C. In an analogous manner it can be condensed with magnesium methyl bromide in tetrahydrofuran in the presence of cuprous chloride by employing the technique described in Step C to obtain 17β-benzoyloxy-7α-methyl-des-A-estrane-11α-ol-5-one.

Step E.—Preparation of 7α-methyl-des-A-$\Delta^9$-estrene-17β-ol-5-one, X 0.272 g. of 17β-benzoyloxy-7α-methyl-des-A-$\Delta^9$-estrene-5-one, IX, were introduced into 2.7 cc. of methanol. 0.1 cc. of a potassium hydroxide solution was added thereto, and the reaction mixture was heated at reflux for 1 hour under an atmosphere of nitrogen. Thereafter, the reaction mixture was poured into water and extracted with methylene chloride.

The extracts were washed with water, dried and evaporated to dryness to obtain 0.185 g. of 7α-methyl-des-A-$\Delta^9$-estrene-17β-ol-5-one, X, with a melting point of 119–120° C. The product was utilized as such for the next step in the synthesis.

The product occurred in the form of colorless prisms, insoluble in water and in dilute aqueous acids and alkalis, and soluble in most of the common organic solvents.

This compound is not described in the literature.

Step F.—Preparation of 7α-methyl-des-A-$\Delta^9$-estrene-5,17-dione, XI 10.7 g. of 7α-methyl-des-A-$\Delta^9$-estrene-17β-ol-5-one, X, were dissolved in 64 cc. of acetone. The solution was agitated, cooled to about 0° C., then 12.3 cc. of the following solution were added dropwise:

Chromic acid anhydride _____ g__ 67.5
Sulfuric acid _____ cc__ 57.5 and water in sufficient quantity to obtain a solution of 250 cc.

The reaction mixture was agitated for 1 hour at room temperature. Thereafter, the reaction mixture was poured into water. The solvent was removed. Ice was added to the mixture. The residue was vacuum filtered, washed with water and dried. 8.205 g. of 7α-methyl-des-A-$\Delta^9$-estrene-5,17-dione, XI, were thus obtained. The product, recrystallized from ethanol, had a melting point of 140° C. and a specific rotation $[\alpha]_D^{20}$ =+96.5° (c.=0.45% in chloroform).

Ultraviolet spectra (ethanol):
   $\lambda_{max}$ 240–241 m$\mu$; $\epsilon$=13,400

The product was colorless, insoluble in water, in dilute aqueous acids and alkalis, and soluble in most of the usual organic solvents.

Analysis.—$C_{15}H_{20}O_2$; molecular weight=232.31. Calculated: C, 77.55%; H, 8.68%. Found: C, 77.3%; H, 8.8%.

This compound is not described in the literature.

Step G.—Preparation of 5-pyrrolidyl-7α-methyl-des-A-$\Delta^{5(10),9(11)}$-estradiene-17-one, XII Under agitation and under an atmosphere of nitrogen, 51 mg. of 7α-methyl-des-A-$\Delta^9$-estrene-5,17-dione, XI, were dissolved in 0.1 cc. of pyrrolidine, then 1 cc. of methanol was added thereto and the reaction mixture was heated for 10 minutes at a temperature of 60–70° C. Next, the reaction mixture was cooled, evaporated to dryness, and 66 mg. of 5-pyrrolidyl-7α-methyl-des-A-$\Delta^{5(10),9(11)}$-estradiene-17-one, XII, were obtained having a melting point of about 55° C.

Ultraviolet spectra (ethyl ether):
   $\lambda_{max.}$ 284 m$\mu$; $\epsilon$=9,975

The product was insoluble in water and in dilute aqueous acids and alkalis and soluble in most of the common organic solvents.

This compound is not described in the literature.

Step H.—Preparation of 3-chloro-7α-methyl-4,5-seco-$\Delta^{2,9}$-estradiene-5,17-dione, XIII While working under an atmosphere of nitrogen, 13.1 g. of 5-pyrrolidyl-7α-methyl-des-A-$\Delta^{5(10),9(11)}$-estradiene-17-one, XII, were dissolved in 71.5 cc. of a 10.9% potassium iodide solution in dimethylformamide. The solution was cooled to a temperature of about 0° C. Then 12.7 cc. of 1,3-dichloro-2-butene were added thereto and the agitation was maintained for 2½ hours at the low temperature. Thereafter, the reaction mixture was diluted with water, heated at a temperature of 90° C. for a period of two and a half hours, cooled and finally extracted with methylene chloride.

The extracts were washed with water, dried and evaporated to dryness. The residue was subjected to chromatography through magnesium silicate with elutions with methylene chloride.

14.4 g. of 3-chloro-7α-methyl-4,5-seco-$\Delta^{2,9}$-estradiene-5,17-dione, XIII, were obtained, which product was used as such for the next step in the synthesis.

Ultraviolet spectra (ethanol):
   $\lambda_{max.}$ 249–250 m$\mu$; $\epsilon$=9,450

The product was insoluble in water and in dilute aqueous acids and alkalis, and soluble in most of the usual organic solvents.

This compound is not described in the literature.

Step I.—Preparation of 7α-methyl-4,5-seco-$\Delta^9$-estrene-3,5,17-trione, XIV

While working under an atmosphere of nitrogen, 14.4 g. of 3 - chloro - 7α-methyl-4,5-seco-$\Delta^{2,9}$-estradiene-5,17-dione, XIII, were dissolved in 70 cc. of methylene chloride. The reaction mixture was cooled to about 0° C. Then 70 cc. of sulfuric acid were added dropwise and the mixture was agitated for 15 minutes at a temperature of about 0° C. Thereafter, the reaction mixture was cooled to a temperature of −10 to −15° C. and very slowly water was added. The mixture was then diluted with methylene chloride.

The organic phase was separated, washed with water, dried and evaporated to dryness. The residue was subjected to chromatography through magnesium silicate with elutions with methylene chloride containing increasing amounts of acetone. The fractions, eluted with methylene chloride containing 2 and 3% of acetone, were combined, filtered and evaporated to dryness.

8.338 g. of 7α-methyl-4,5-seco-$\Delta^9$-estrene-3,5,17-trione, XIV, were thus obtained, which was utilized as such for the next step in the synthesis.

Ultraviolet spectra (ethanol):
$\lambda_{max}$. 252 m$\mu$; $\epsilon$=10,690

The product was insoluble in water, and in dilute aqueous acids and alkalis, and soluble in most of the usual organic solvents.

This compound is not described in the literature.

Step J.—Preparation of 3-pyrrolidyl-7$\alpha$-methyl-$\Delta^{3,5(10),9(11)}$-estratriene-17-one, XV While working under an atmosphere of nitrogen, 9.812 g. of 7$\alpha$-methyl-4,5-seco-$\Delta^9$-estrene-3,5,17-trione, XIV, were dissolved in 45 cc. of anhydrous methanol, then 4.5 cc. of anhydrous pyrrolidine were added and the mixture was agitated for 20 hours.

Thereafter, the reaction mixture was cooled for 1 hour at a temperature of −10° C. Then it was vacuum filtered. The residue was washed with iced methanol and dried. Thus 7.457 g. of 3-pyrrolidyl-7$\alpha$-methyl-$\Delta^{3,5(10),9(11)}$-estradiene-17-one, XV, were obtained, having a melting point of 156° C.

The product occurred in the form of needles, insoluble in water and in dilute aqueous acids and alkalis, slightly soluble in methanol and ethanol, and soluble in ether, benzene and chloroform.

This compound is not described in the literature.

Step K.—Preparation of 7$\alpha$-methyl-$\Delta^{5(10),9(11)}$-estradiene-3,17-dione, XVI While working under an atmosphere of nitrogen, 7.777 g. of 3-pyrrolidyl-7$\alpha$-methyl-$\Delta^{3,5(10),9(11)}$-estratriene-17-one, XV, were dissolved in 15 cc. of acetic acid; then at room temperature 200 cc. of water were added and the reaction mixture was allowed to stand for 2 hours.

Next, the reaction mixture was iced for 1 hour and vacuum filtered. The residue was washed with water and dried. Thus, 5.2 g. of 7$\alpha$-methyl-$\Delta^{5(10),9(11)}$-estradiene-3,17-dione, XVI, were obtained. The product, passed through magnesium silicate and recrystallized from isopropyl ether, had a melting point of 141° C. and a specific rotation [$\alpha$]$_D^{20}$=+272° (c.=0.75% in chloroform).

Ultraviolet spectra (ethanol):
$\lambda_{max}$. 241 m$\mu$; $\epsilon$=19,050

The product occurred in the form of colorless needles, insoluble in water and in dilute aqueous acids and alkalis, and soluble in most of the common organic solvents.

Analysis.—$C_{19}H_{24}O_2$; molecular weight=284.38. Calculated: C, 80.24%; H, 8.50%. Found: C, 80.1%; H, 8.2%.

This compound is not described in the literature.

Step L.—Preparation of 7$\alpha$,17$\alpha$-dimethyl-$\Delta^{5(10),9(11)}$-estradiene-17$\beta$-ol-3-one, XIX (1) Ketalization.—While working under an atmosphere of nitrogen, 0.5 g. of 7$\alpha$-methyl-$\Delta^{5(10),9(11)}$-estradiene-3,17-dione, XVI, was dissolved in 2.5 cc. of methanol. 0.125 cc. of a 0.07 N hydrochloric acid solution in methanol was added and the reaction mixture was allowed to stand for 1 hour at room temperature.

Next, the reaction mixture was placed in the refrigerator for 2 hours, then vacuum filtered. The residue was washed with water and dried. 525 mg. of 3,3-dimethoxy-7$\alpha$-methyl-$\Delta^{5(10),9(11)}$-estradiene-17-one, XVII, were obtained.

After recrystallization from methanol, the product had a melting point of 159° C. and a specific rotation [$\alpha$]$_D^{20}$=+271° (c.=0.83% in chloroform).

Ultraviolet spectra (ethanol):
$\lambda_{max}$. 243 m$\mu$; $\epsilon$=20,050

The product was colorless, insoluble in water and in dilute aqueous alkalis, and soluble in most of the common organic solvents.

This compound is not described in the literature.

(2) Alkylation.—Within the space of 20 minutes, 1.732 g. of 3,3-dimethoxy-7$\alpha$-methyl-$\Delta^{5(10),9(11)}$-estradiene-17-one, XVII, dissolved in 90 cc. of anhydrous benzene, were added to 110 cc. of a solution containing 2.3 M of magnesium methyl bromide in ether and cooled to about 0° C. The reaction mixture was agitated at room temperature for 20 hours. Thereafter, the mixture was poured into a saturated aqueous solution of ammonium chloride, iced and the organic phase was decanted. The organic phase was washed with water until the wash waters were neutral, dried and evaporated to dryness under vacuum.

In this way, 2.045 g. of 3,3-dimethoxy-7$\alpha$,17$\alpha$-dimethyl-$\Delta^{5(10),9(11)}$-estradiene-17$\beta$-ol, XVIII, were obtained, which was used as such for the next step in the synthesis.

Ultraviolet spectra (ethanol):
$\lambda_{max}$. 243 m$\mu$; $\epsilon$=17,400

The product was insoluble in water and in dilute aqueous acids and alkalis and soluble in most of the usual organic solvents.

This compound is not described in the literature.

(3) Hydrolysis.—Under an inert atmosphere, 2 g. of 3,3-dimethoxy-7$\alpha$,17$\alpha$-dimethyl-$\Delta^{5(10),9(11)}$-estradiene-17$\beta$-ol, XVIII, were introduced into 10 cc. of a 5% acetic acid solution. The mixture was agitated for 15 minutes. 5 cc. of water were added and the agitation was kept up for 15 minutes more. Then the reaction mixture was slowly poured into a saturated solution of sodium bicarbonate and extracted with methylene chloride.

The extracts were washed with water, dried, evaporated to dryness to obtain 1.77 g. of 7$\alpha$,17$\alpha$-dimethyl-$\Delta^{5(10),9(11)}$-estradiene-17$\beta$-ol-3-one, XIX.

Ultraviolet spectra (ethanol):
$\lambda_{max}$. 241 m$\mu$; $\epsilon$=14,900

The product was insoluble in water, in dilute aqueous acids and alkalis and soluble in most of the common organic solvents. This compound is not described in the literature.

EXAMPLE 19

PREPARATION OF 17$\beta$-METHOXY-17$\alpha$-METHYL-$\Delta^{4,9,11}$-ESTRATRIENE-3-ONE By applying the process described in Example I to 17$\beta$-methoxy-17$\alpha$-methyl-$\Delta^{5(10),9(11)}$-estradiene-3-one dissolved in benzene, the corresponding 17$\beta$-methoxy-17$\alpha$-methyl-$\Delta^{4,9,11}$-estratriene-3-one was obtained, which is a novel compound.

This product is insoluble in water, and soluble in alcohols, ether, acetone, benzene and chloroform.

Infrared spectra (chloroform):
Presence of trienone C=O max. 1638 cm.$^{-1}$
C=C max. 1563 cm.$^{-1}$
Presense of C—O—C max. 1092 cm.$^{-1}$ Ultraviolet spectra (ethanol):
$\lambda_{max}$. 238 m$\mu$; $E_{1cm}^{1\%}$=193
Inflection toward 270 m$\mu$; $E_{1cm}^{1\%}$=116
$\lambda_{max}$. 340 m$\mu$; $E_{1cm}^{1\%}$=925

The utilization of 2,3-dibromo-5,6-dicyano-p-benzoquinone in the place of the corresponding dichloro derivative led to the same result.

The 17$\beta$-methoxy-17$\alpha$-methyl-$\Delta^{4,9,11}$-estratriene-3-one is endowed with an anabolisant and androgenic action. It is active when orally administered.

17$\beta$-methoxy-17$\alpha$-methyl-$\Delta^{5(10),9(11)}$-estradiene-3-one, used as starting compound, was prepared according to the conventional methods starting with 3,3-dimethoxy-17$\alpha$-methyl-$\Delta^{5(10),9(11)}$-estradiene-17$\beta$-ol (described in Example 7) according to the flow diagram of Table III.

TABLE III

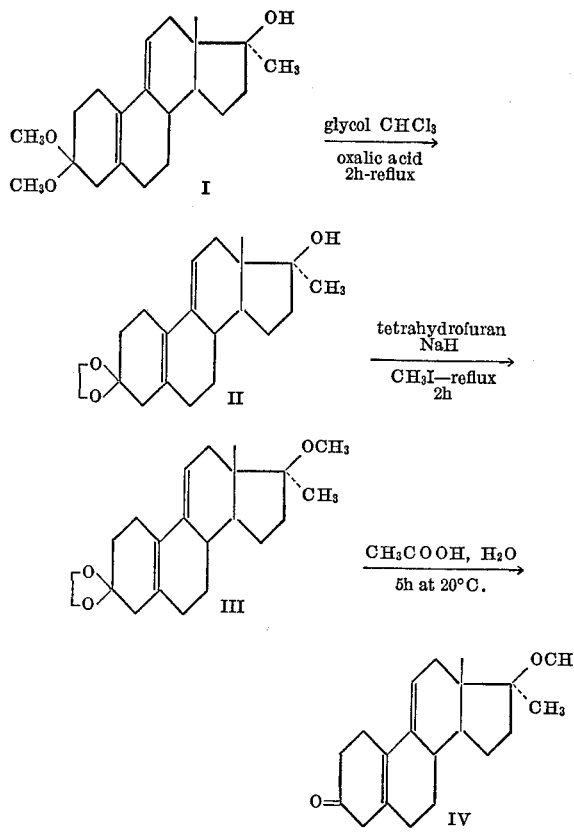

EXAMPLE 20

PREPARATION OF 17β-METHYL-Δ4,9,11-ESTRATRIENE-17α-OL-3-ONE (ANTIPODAL)

By applying the process described in Example 1 to 17β-methyl-Δ5(10),9(11)-estradiene-17α-ol-3-one (antipodal), the corresponding 17β-methyl-Δ4,9,11-estratriene-17α-ol-3-one (antipodal) was obtained, which is a novel compound. This compound is also named 17β,13α-dimethyl-14β-H-Δ4,9,11-gonatriene-17α-ol-3-one.

This product is insoluble in water and ether, soluble in alcohols, acetone, benzene and chloroform. It has a melting point of 170° C. and a specific rotation $$[\alpha]_D^{20} = +61.4°$$

(c.=0.5% in ethanol).

The use of 2,3-dibromo-5,6-dicyano-p-benzoquinone instead of the corresponding dichloro derivative led to the same result.

17β-methyl-Δ5(10),9(11)-estradiene-17α-ol-3-one (antipodal), utilized as starting product, may be prepared as follows:

The process started with 1,5-dioxo-4-(2'-carboxyethyl)-7aα-methyl-5,6,7,7a-tetrahydro-indane (having a melting point of 143° C. and a specific rotation $[\alpha]_D^{20} = -247°$ (c.=1% in acetone)) prepared by the resolution, by means of l-ephedrine of the corresponding racemic acid, described in the copending, commonly-assigned U.S. Patent application Ser. No. 361,872, filed Apr. 22, 1964. Then, by applying to this compound successively the methods described in U.S. Patent application Ser. No. 361,872, in the copending commonly-assigned U.S. patent application Ser. No. 373,048, filed June 5, 1964, now Pat. No. 3,282,785, and in the Examples 2 and 7 of the preceding text, 17β-methyl-Δ5(10),9,(11)-estradiene-17α-ol-3-one (antipodal) was obtained according to the flow diagram of Table IV.

TABLE IV

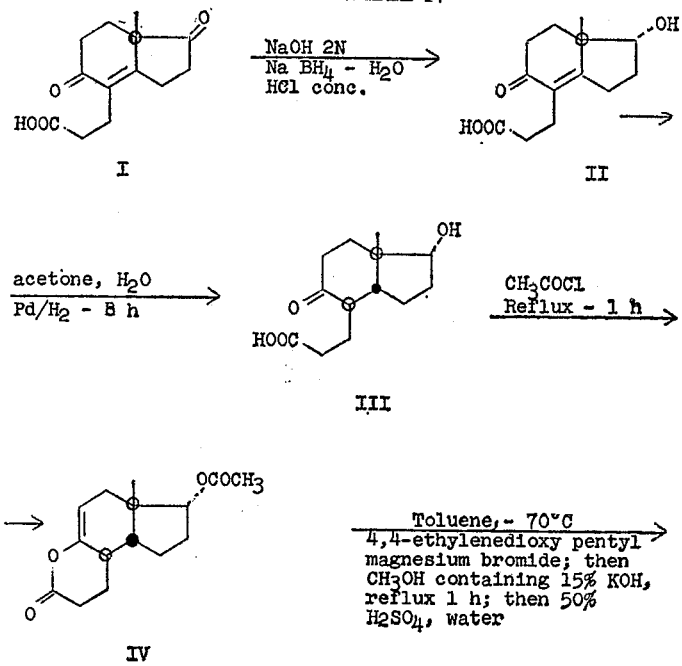

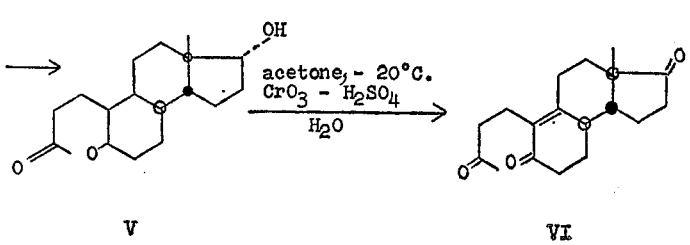

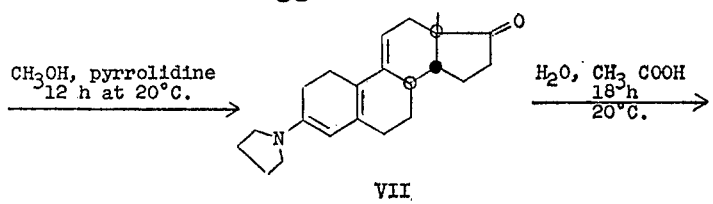

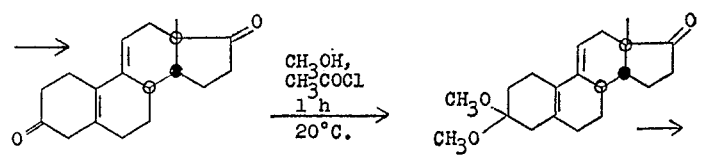

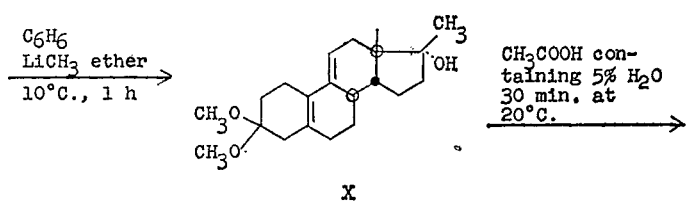

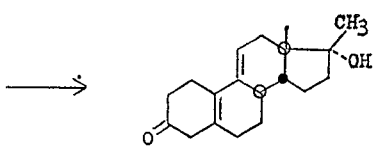

EXAMPLE 21

PREPARATION OF 17α-METHYL-19-NOR-Δ[4,9,11]-PREGNATRIENE-3,20-DIONE

By applying the process, described in Example 1, to 17α-methyl-19-nor-Δ[5(10),9(11)]-pregnadiene-3,20-dione, the corresponding 17α-methyl - 19 - nor-Δ[4,9,11]-pregnatriene-3,20-dione was obtained. The product had a melting point of 91° C. and a specific rotation $[\alpha]_D^{20} = -57.5° \pm 3°$ (c.=0.39% in dioxane).

Using 2,3-dibromo-5,6-dicyano-p-benzoquinone instead of the corresponding dichloro derivative lead to the same result.

This compound possesses a progestative and a progestommetic activity.

17α-methyl-19-nor-Δ[5(10),9(11)]-pregnadiene-3,20 - dione, utilized as starting compound, may be prepared according to the flow diagram of Table V.

TABLE V

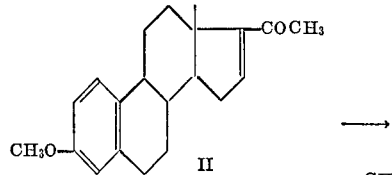

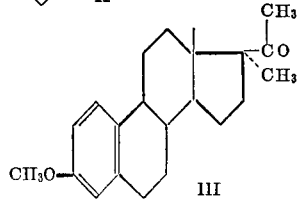

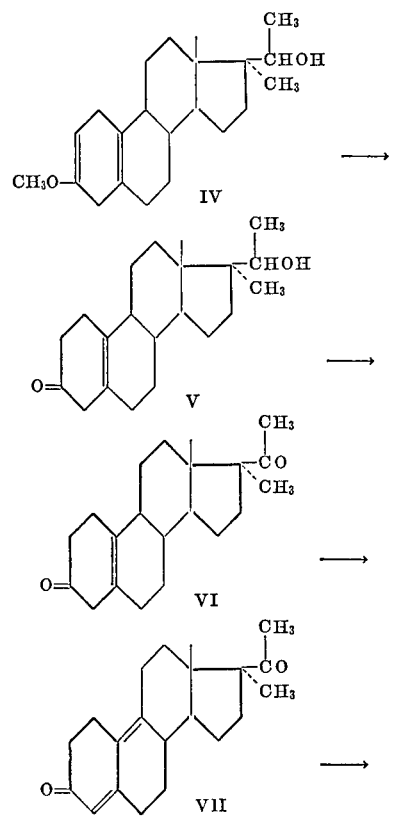

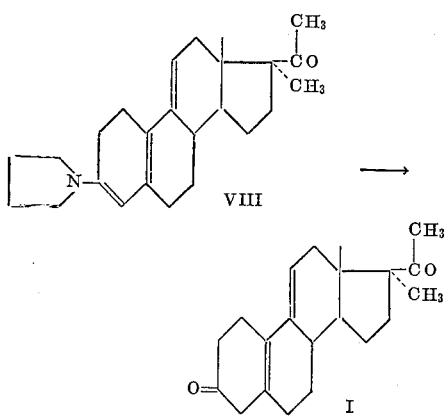

The operative mode is as follows:

Step A.—Preparation of 3-methoxy-17α-methyl-19-nor-Δ$^{1,3,5(10)}$-pregnatriene-20-one, III Under agitation and an inert atmosphere, 1.150 g. of lithium were introduced into 1 liter of ammonia cooled to a temperature of —70° C. For 15 minutes this reaction mixture was agitated, then, while maintaining the temperature at about —75° C., 1 liter of ether was added thereto, followed by 20 g. of 3-methoxy-19-nor-Δ$^{1,3,5(10),16}$-pregnatetraene-20-one, II. The mixture was allowed to stand for 2 hours at a temperature of —75° C., under continued agitation and under continued inert atmosphere. Next, 160 cc. of methyl iodide were added and the reaction mixture was again agitated for 2 hours at —75° C.

Thereafter, the ammonia was evaporated, 1 liter of water was added, and the aqueous phase was separated and extracted with either. The ethereal phases now combined were washed with water until the wash waters were neutral, then dried over sodium sulfate, filtered and distilled to dryness. In this way 21 g. of product were obtained, which was dissolved in 210 cc. of ethanol under reflux. Next, 21 cc. of acetic acid and 21 g. of Girard's reactant T were added thereto. The mixture was agitated for 1½ hours under an atmosphere of nitrogen while maintaining the reflux. Thereafter, the reaction mixture was cooled to room temperature and then poured into 1050 cc. of water. Next, 155 cc. of 2 N sodium hydroxide solution were added and finally the mixture was extracted with ether. The combined ethereal phases were washed with water until the wash waters were neutral, dried over sodium sulfate, filtered and evaporated to dryness. 16.80 g. of raw product III were recovered, which was purified by means of redissolving the product obtained in acetone under reflux and by recrystallization by heating and cooling.

13.185 g. of 3-methoxy-17α-methyl-19-nor-Δ$^{1,3,5(10)}$-pregnatriene-20-one, III, were thus obtained, in the form of a colorless, solid product, easily soluble in ether, soluble in alcohol, benzene and chloroform and insoluble in water. This product had a meting point of 109° C. and a specific rotation of $[\alpha]_D = +75° \pm 1°$ (c.=0.5% in chloroform).

Analysis.—$C_{22}H_{30}O_2$; molecular weight =326.46. Calculated: C, 80.93%; H, 9.26%. Found: C, 80.9%; H, 9.3%.

Ultraviolet spectra:

Inflection toward 229 mμ; $E^{1\%}_{1 cm.} = 211$
Inflection toward 273 mμ; $E^{1\%}_{1 cm.} = 47.6$
$\lambda_{max.}$ at 278 mμ; $E^{1\%}_{1 cm.} = 62.6$
$\lambda_{max.}$ at 287 mμ; $E^{1\%}_{1 cm.} = 58.2$ This product is not described in the literature.

The starting compound, namely 3-methoxy-19-nor-Δ$^{1,3,5(10),16}$-pregnatetraene-20-one, was obtained according to the process described by Burn, J. Chem. Soc. 1962, p. 364.

Step B.—Preparation of 3-methoxy-17α-methyl-19-nor-Δ$^{2,5(10)}$-pregnadiene-20-ol, IV 500 cc. of ammonia and a solution of 20 g. of 3-methoxy - 17α - methyl-19-nor-$^{1,3,5(10)}$-pregnatriene-20-one, III, were admixed with 400 cc. of tetrahydrofuran, and 10 cc. of ethanol were added thereto. The interior temperature was lowered to about —35° C. Next, under an inert atmosphere 2.150 g. of lithium were added and the reaction mixture was agitated for 15 minutes, thereafter 10 cc. of ethanol and again 2.150 g. of lithium were added. After agitating the mixture for a further 15 minutes again 30 cc. of ethanol, then 2.150 g. of lithium were added. After maintaining the reaction mixture at —35° for 30 minutes, 30 cc. of ethanol were added thereto. The ammonia was evaporated by bringing the temperature back to +20° C. 500 cc. of water were added and the mixture was extracted with ether. The aqueous phase was discarded after having been extracted with ether. The combined ethereal phases were washed with water, dried over sodium sulfate, filtered and distilled to dryness. 20.240 g. of 3 - methoxy-17α-methyl-19-nor-Δ$^{2,5(10)}$-pregnadiene-20-ol, IV, were obtained, which product was utilized as such for the next step. The compound occurred in the form of an amorphous product, soluble in alcohol, either, benzene and acetone, and insoluble in water.

This product is not described in the literature.

Step C.—Preparation of 17α-methyl-19-nor-Δ$^{5(10)}$-pregnene-20-ol-3-one, V 20 g. of Compound IV were dissolved in 35 cc. of acetone, while agitating the solution for 15 minutes at room temperature. Thereafter, 300 cc. of acetic acid containing 25% of water were added to the reaction mixture, which was then agitated for 3 hours and thereafter poured into a water-ether mixture and agitated for 10 minutes. The aqueous phase was separated after extracting with ether. The ethereal phases were washed first and an aqueous solution of sodium bicarbonate, then with water, dried over sodium sulfate, filtered and distilled to dryness.

19.140 g. of 17α-methyl-19-nor-Δ$^{5(10)}$-pregnene-20-ol-3-one, V, were obtained, this product being utilized as such for the following step. The compound obtained occurred in the form of a colorless, amorphous product, soluble in alcohol, ether, benzene, acetone and chloroform, and insoluble in water.

This compound is not described in the literature.

Step D.—Preparation of 17α-methyl-19-nor-Δ$^{5(10)}$-pregnene-3,20-dione, VI 20.5 g. of Compound V were dissolved in 615 cc. of acetone under an atmosphere of nitrogen and under agitation. The solution obtained was cooled to —20° C. Next, 21 cc. of a solution of 54 g. of chromic acid anhydride and 46 cc. of dilute sulfuric acid were added thereto. The solution was allowed to stand for 1 hour under agitation at about —10° C. It was then pourned into 2 liters of a mixture of ice and water and extracted with benzene. The combined organic phases were washed first with water, then with a saturated solution of sodium bicarbonate and again with water. Next, these phases were dried over magnesium sulfate and distilled to dryness.

20.40 g. of crude product were thus obtained, which was purified by subjecting it to chromatography through magnesium silicate and elution with benzene containing 2.5% of acetone, and recrystallization from isopropyl ether. By this process 8.50 g. of 17α-methyl-19-nor-Δ$^{5(10)}$-pregnene-3,20-dione, VI, were obtained in the form of a colorless crystallized product, soluble in alcohol, ether, acetone, benzene and chloroform, and insoluble in water. This product had a melting point of 138° C. and a specific rotation of $[\alpha]_D = +168.5° \pm 3.5°$ (c.=0.50% in chloroform).

Analysis.—$C_{21}H_{30}O_2$; molecular weight=314.45. Calculated: C, 80.20%; H, 9.61%. Found: C, 80.5%; H, 9.6%.

This product is not described in the literature.

Step E.—Preparation of 17α-methyl-19-nor-Δ⁴,⁹-pregnadiene-3,20-dione, VII

Under agitation and an atmosphere of nitrogen, 8.50 g. of Compound VI were dissolved in 85 cc. of pyridine and cooled to 0° C. Next, 16.3 cc. of a 29% bromine solution in methanol were added thereto. The agitation was continued for 30 minutes at the temperature of 0° C.; thereafter the temperature was raised to room temperature, and the solution was allowed to stand for 16 hours under agitation.

The solution was then poured into 850 cc. of a mixture of ice and water, 82 cc. of hydrochloric acid were added and the mixture was extracted with methylene chloride. The combined organic phases were washed with water until the wash waters were neutral, then dried over magnesium sulfate and finally distilled to dryness. 8.480 g. of a crude product were recovered, which was purified by recrystallization from isopropyl ether.

In this manner, 5.810 g. of 17α-methyl-19-nor-Δ⁴,⁹-pregnadiene-3,20-dione, VII, were obtained having a melting point of 106° C. and a specific rotation $[\alpha]_D^{20} = -270° \pm 4.5°$ (c.=0.44% in ethanol).

Analysis.—$C_{21}H_{28}O_2$; molecular weight=312.43. Calculated: C, 80.72%; H, 9.03%. Found: C, 80.6%; H, 8.9%.

Ultraviolet spectra (ethanol):

$\lambda_{max}$ at 214 mμ; $E_{1cm.}^{1\%}$=203
Inflection toward 235 mμ; $E_{1cm.}^{1\%}$=157
$\lambda_{max}$ at 302 mμ; ε=20,800

This product is not described in the literature.

Step F.—Preparation of 3-pyrrolidyl-17α-methyl-19-nor-Δ³,⁵(¹⁰),⁹(¹¹)-pregnatriene-20-one, VIII Under agitation and an atmosphere of nitrogen, 5.5 g. of compound VII were introduced into 66 cc. of anhydrous methanol. Next, 1.85 cc. of pyrrolidine were added to the suspension obtained, and the solution was maintained at a temperature of 20° C. for 2 hours. Thereafter, the solution was cooled to 0° C., vacuum filtered and washed with methanol. 612 g. of 3-pyrrolidyl-17α-methyl-19-nor-Δ³,⁵(¹⁰),⁹(¹¹)-pregnatriene-20-one, VIII, were obtained; which product was used as such for the next step.

This compound is not described in the literature.

Step G.—Preparation of 17α-methyl-19-nor-Δ⁵(¹⁰),⁹(¹¹)-pregnadiene-3,20-dione, I 6.12 g. of compound VIII, obtained in the preceding step, were introduced into 12 cc. of methanol, then 6.1 cc. of water and 3 cc. of acetic acid were added to the suspension formed and the solution was agitated for 2 hours at 20° C. The reaction mixture solidified, 60 cc. of water were added, thus forming a suspension, which was kept at 20° C. for 16 hours under agitation and under an atmosphere of nitrogen, next, 250 cc. of water were introduced into the suspension, which was then vacuum filtered and washed with water. After drying under vacuum, 4.25 g. of 17α-methyl-19-nor-Δ⁵(¹⁰),⁹(¹¹)-pregnadiene-3,20-dione, I, were obtained, having a melting point of 151° C.

This compound is not described in the literature.

EXAMPLE 22

PREPARATION OF 21-ACETOXY-19-NOR-Δ⁴,⁹,¹¹-PREGNATRIENE-3,20-DIONE

By applying the process described in Example I to 21-acetoxy-19-nor-Δ⁵(¹⁰),⁹(¹¹)-pregnadiene-3,20-dione, the corresponding 21-acetoxy-19-nor-Δ⁴,⁹,¹¹-pregnatriene-3,20-dione was obtained, which to the knowledge of the applicants is a novel compound.

This compound is insoluble in water, and soluble in alcohols and chloroform. It has a melting point of 137° C. and a specific rotation $[\alpha]_D^{20} = +87.5° \pm 2.5°$ (c.=0.5% in ethanol). The utilization of 2,3-dibromo-5-dicyano-p-benzoquinone instead of the corresponding dichloro derivative led to the same result.

The 21-acetoxy-19-nor-Δ⁵(¹⁰),⁹(¹¹)-pregnadiene-3,20-dione, utilized in the preceding as starting material, may be prepared according to the usual methods for the introduction of a 21 hydroxyl group by starting with 19-nor-Δ⁵(¹⁰),⁹(¹¹)-pregnadiene-3,20-dione, described in U.S. patent 3,118,919, in accordance with the reaction formula of Table VI.

TABLE VI

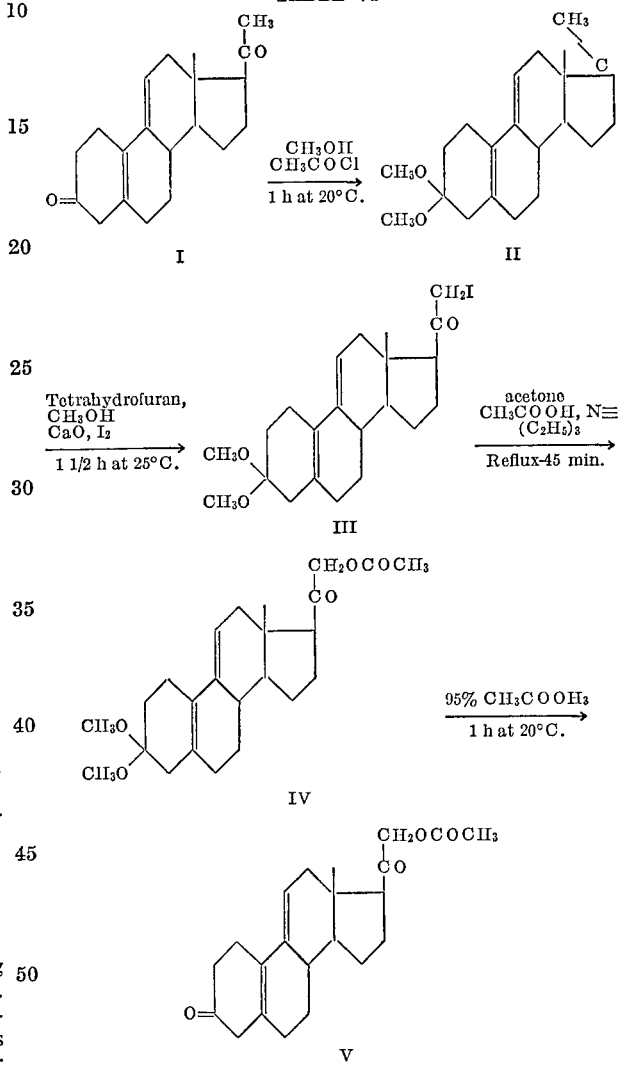

The preceding specific embodiments are illustrative of the invention. It is to be understood, however, that other expedients known to those skilled in the art may be employed without departing from the spirit of the invention.

We claim:

1. A process for the production of a 3-oxo-19-nor-Δ⁴,⁹,¹¹-trienic steroid which comprises the steps of reacting a corresponding 19-nor-Δ⁵(¹⁰),⁹(¹¹)-dienic steroid having a substituent in the 3 position selected from the group consisting of keto and hydroxyl in an organic solvent with a dehydrogenating substituted p-quinone having the formula

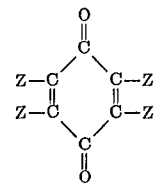

wherein Z represents a member selected from the group consisting of hydrogen, halogen and cyano, with the proviso that Z represents no more than two hydrogens, and recovering said 3-oxo-19-nor-Δ⁴,⁹,¹¹-trienic steroid.

2. A process for the production of a 3-oxo-19-nor-Δ⁴,⁹,¹¹-trienic steroid selected from the group consisting of the 18,19-bis-nor-13-lower alkyl gonane and 18,19-bis-nor-13-lower alkyl pregnane series which comprises the steps of reacting a 3-oxo-19-nor-Δ⁵⁽¹⁰⁾,⁹⁽¹¹⁾-dienic steroid selected from the group consisting of the 18,19-bis-nor-13-lower alkyl gonane and 18,19-bis-nor-13-lower alkyl pregnane series in an organic solvent with a dehydrogenating substituted p-quinone having the formula

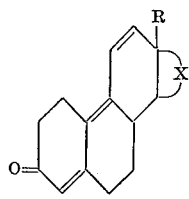

wherein Z represents a member selected from the group consisting of hydrogen, halogen and cyano, with the proviso that Z represents no more than two hydrogens, and recovering said 3-oxo-19-nor-Δ⁴,⁹,¹¹-trienic steroid.

3. A process for the production of a 3-oxo-19-nor-Δ⁴,⁹,¹¹-trienic steroid of the formula

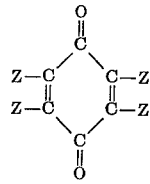

wherein R represents lower alkyl and X represents a member selected from the group consisting of an unsubstituted remainder of the pentagonal D-ring, a substituted remainder of the pentagonal D-ring, substituted remainder of the hexagonal D-homo ring and an unsubstituted remainder of the hexagonal D-homo ring, which comprises the steps of reacting the corresponding 3-oxo-19-nor-Δ⁵⁽¹⁰⁾,⁹⁽¹¹⁾-dienic steroids of the formula

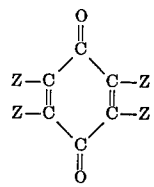

wherein R and X have the above assigned values in an organic solvent with a dehydrogenating substituted p-benzoquinone having the formula

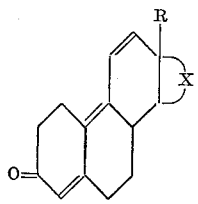

wherein Z represents a member selected from the group consisting of hyrogen, halogen and cyano, with the proviso that Z represents no more than two hydrogens, and recovering said 3-oxo-19-nor-Δ⁴,⁹,¹¹-trienic steroid.

4. The process of claim 3 wherein said dehydrogenating substituted p-benzoquinone is 2,3-dichloro 5,6-dicyano p-benzoquinone.

5. The process of claim 3 wherein said dehydrogenating substituted p-benzoquinone is 2,3-dibromo 5,6-dicyano p-benzoquinone.

6. The process of claim 3 wherein said reaction is conducted at room temperature.

7. A 19-nor-Δ⁵⁽¹⁰⁾,⁹⁽¹¹⁾-dienic steroid of the formula

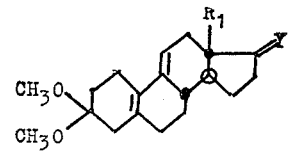

wherein $R_1$ is lower alkyl having at least 2 carbon atoms and Y is a member selected from the group consisting of O and

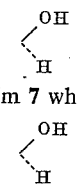

8. The product of claim 7 wherein $R_1$ is ethyl and Y is $$\underset{H}{\overset{OH}{<}}$$

9. The product of claim 7 wherein $R_1$ is ethyl and Y is O.

10. 3,3-dimethoxy-Δ⁵⁽¹⁰⁾,⁹⁽¹¹⁾-estradiene-17-one.

11. 3,3-dimethoxy-17α-propynyl-Δ⁵⁽¹⁰⁾,⁹⁽¹¹⁾-esteradiene-17β-ol.

12. A 19-nor-Δ⁵⁽¹⁰⁾,⁹⁽¹¹⁾-dienic steroid of the formula

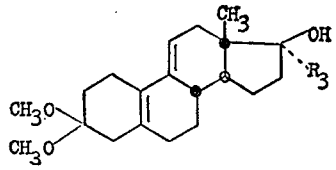

wherein $R_3$ is a member selected from the group consisting of ethyl and allyl.

13. 13β-ethyl-17α-methyl-Δ⁵⁽¹⁰⁾,⁹⁽¹¹⁾-gonadiene-17β-ol-3-one.

14. 3-ethylenedioxy-13β-ethyl-17α - methyl - Δ⁵⁽¹⁰⁾,⁹⁽¹¹⁾-gonadiene-17β-ol.

15. 17aβ-acetoxy-D-homo-Δ⁴,⁹,¹¹-estratriene-3-one.

16. 7α,17α-dimethyl-Δ⁴,⁹,¹¹-estratriene-17β-ol-3-one.

17. 17β-methoxy-17α-methyl-Δ⁴,⁹,¹¹-estratriene-3-one.

18. 21-acetoxy-19-nor-Δ⁴,⁹,¹¹-pregnatriene-3,20-dione.

19. 17β,13α-dimethyl-14β-H-Δ⁴,⁹,¹¹-gonatriene-17α-ol-3-one.

References Cited

UNITED STATES PATENTS

| | | | |
|---|---|---|---|
| 3,052,672 | 9/1962 | Nomine et al. | 260—239.5 |
| 3,086,027 | 4/1963 | Perelman et al. | 260—397.3 |
| 3,102,125 | 8/1963 | Kincl et al. | 260—397.4 |
| 3,280,157 | 10/1966 | Legatt et al. | 260—397.4 |
| 2,860,148 | 11/1958 | Hershberg | 260—397.45 |

OTHER REFERENCES

Miramontes et al.: J.A.C.S., 73, pp. 3540–41, p. 3541 relied on (1951).

Deghenehi et al.: J.A.C.S. 83, p. 4668 (1961).

HENRY A. FRENCH, Primary Examiner.

U.S. Cl. X.R.

260—488, 999, 2395, 3973, 3974, 3975, 39745

Disclaimer 3,453,267.—*Michel Vignau*, Neuilly-sur-Seine, *Robert Bucourt*, Clichy-sous-Bois, *Jean Tessier*, Vincennes, *Germain Costerousse*, Montrouge, *Lucien Nedelec*, Clichy-sous-Bois, *Jean-Claude Gasc*, Bondy, *Robert Joly*, Montmorency, *Julien Warnant*, Neuilly-sur-Seine, and *Bernard Goffinet*, Paris, France. NOVEL PROCESS FOR THE PREPARATION OF 3-OXO-$\Delta^{4,9,11}$-TRIENIC STEROIDS. Patent dated July 1, 1969. Disclaimer filed Sept. 21, 1970, by the inventors and the assignee, *Roussel UCLAF*.

Hereby enter this disclaimer to claim 16 of said patent.

[*Official Gazette November 24, 1970.*]